US011520315B2

(12) United States Patent
Mizuno et al.

(10) Patent No.: US 11,520,315 B2
(45) Date of Patent: Dec. 6, 2022

(54) PRODUCTION SYSTEM, PRODUCTION METHOD, AND INFORMATION STORAGE MEDIUM

(71) Applicant: Kabushiki Kaisha Yaskawa Denki, Kitakyushu (JP)

(72) Inventors: Naoki Mizuno, Kitakyushu (JP); Shinichiro Obata, Kitakyushu (JP); Jongbeom Park, Kitakyushu (JP); Aya Matsunaga, Kitakyushu (JP)

(73) Assignee: KABUSHIKI KAISHA YASKAWA DENKI, Fukuoka (JP)

( * ) Notice: Subject to any disclaimer, the term of this patent is extended or adjusted under 35 U.S.C. 154(b) by 107 days.

(21) Appl. No.: 17/120,286

(22) Filed: Dec. 14, 2020

(65) Prior Publication Data
US 2021/0181723 A1    Jun. 17, 2021

(30) Foreign Application Priority Data

Dec. 16, 2019 (JP) .............................. JP2019-226123

(51) Int. Cl.
*G05B 19/418* (2006.01)

(52) U.S. Cl.
CPC ..... *G05B 19/4185* (2013.01); *G05B 19/4183* (2013.01); *G05B 19/41865* (2013.01); *G05B 19/41885* (2013.01)

(58) Field of Classification Search
CPC ............ G05B 19/4185; G05B 19/4183; G05B 19/41865; G05B 19/41885;
(Continued)

(56) References Cited

U.S. PATENT DOCUMENTS 5,369,569 A    11/1994 Maeda et al.
6,741,905 B1 *  5/2004 Fishman .......... G05B 19/40937
                                                700/86
(Continued)

FOREIGN PATENT DOCUMENTS

JP    H05-73125 A    3/1993
JP    H05-134719 A    6/1993
(Continued)

OTHER PUBLICATIONS

The Office Action dated Mar. 17, 2020, for corresponding JP application No. 2019-226123 with the partial translation of the Office Action.
(Continued)

*Primary Examiner* — Christopher E. Everett
(74) *Attorney, Agent, or Firm* — HEA Law PLLC

(57) ABSTRACT

Provided is a production system including: a plurality of industrial machines each configured to execute a process program for executing a predetermined process, and to perform at least one of refer or change of a machine variable; a controller configured to execute a system program for causing each of the plurality of industrial machines to operate based on an execution order specified for a plurality of predetermined processes, and to perform at least one of refer or change of a system variable; a storage configured to store conversion data for converting between the machine variable of each of the plurality of industrial machines and the system variable; and a circuitry configured to perform conversion between the machine variable of the each of the plurality of industrial machines and the system variable based on the conversion data of the each of the plurality of industrial machines.

20 Claims, 24 Drawing Sheets

(58) Field of Classification Search
CPC .............. G05B 19/4155; G05B 19/054; G05B 2219/1103; Y02P 90/02
See application file for complete search history.

(56) References Cited

U.S. PATENT DOCUMENTS

| | | | | |
|---|---|---|---|---|
| 2002/0054099 | A1* | 5/2002 | Schmitt | G05B 19/056 715/762 |
| 2009/0037010 | A1* | 2/2009 | Kawano | G05B 19/408 700/96 |
| 2010/0063608 | A1* | 3/2010 | Miller | G05B 19/409 700/185 |
| 2016/0085235 | A1* | 3/2016 | Kamijo | G05B 19/4063 700/80 |
| 2017/0248929 | A1* | 8/2017 | Oda | G05B 19/0426 |
| 2017/0329315 | A1* | 11/2017 | Kanemaru | B23P 23/06 |
| 2018/0341235 | A1 | 11/2018 | Oda | |

FOREIGN PATENT DOCUMENTS

| | | |
|---|---|---|
| JP | H09-62324 A | 3/1997 |
| JP | 2012-014498 A | 1/2012 |
| JP | 2012-194678 A | 10/2012 |
| JP | 2018-197946 A | 12/2018 |

OTHER PUBLICATIONS

The Office Action dated Jul. 28, 2020, for corresponding JP application No. 2019-226123 with the partial translation of the Office Action.

The Office Action dated Nov. 24, 2020, for corresponding JP application No. 2019-226123 with the partial translation of the Office Action.

* cited by examiner

FIG.3
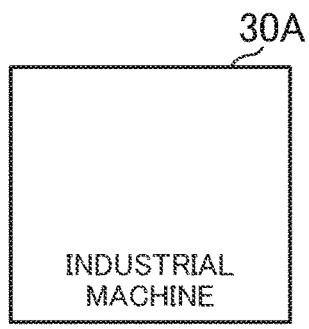
PROCEDURE 1: CREATION OF
PROCESS PROJECT
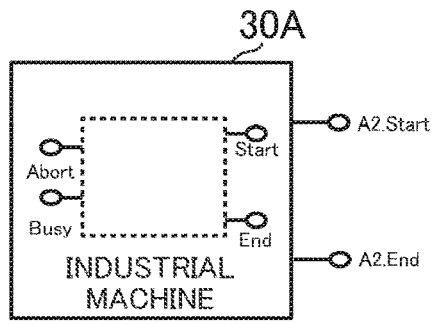
PROCEDURE 2: INITIAL SETTING OF
PROCESS PROGRAM
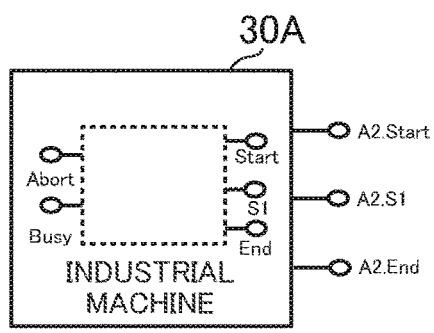
PROCEDURE 3: DETAILED SETTING OF
VARIABLES ETC.
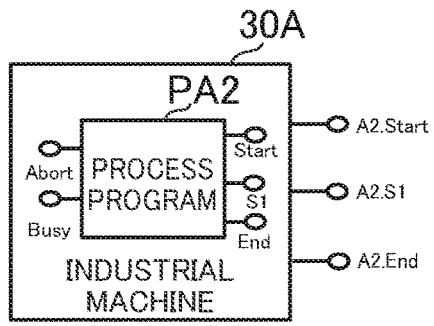
PROCEDURE 4: PROCESS
PROGRAMING

FIG.5

| SYSTEM VARIABLE | MACHINE VARIABLE |
|---|---|
| Equip30A.Step1.ST | A1.Start |
| Equip30A.Step1.EN | A1.End |
| Equip30A.Step2.ST | A2.Start |
| Equip30A.Step2.S-1 | A2.S1 |
| Equip30A.Step2.EN | A2.End |
| Equip30A.Step3.ST | A3.Start |
| Equip30A.Step3.EN | A3.End |

| SYSTEM VARIABLE | MACHINE VARIABLE |
|---|---|
| Equip30B.Step4.ST | B1.Start |
| Equip30B.Step4.EN | B1.End |
| Equip30B.Step5.ST | B2.Start |
| Equip30B.Step5.EN | B2.End |

| SYSTEM VARIABLE | MACHINE VARIABLE |
|---|---|
| Equip30A.Step1.ST | A1.Start |
| Equip30A.Step1.EN | A1.End |
| Equip30A.Step2.ST | A2.Start |
| Equip30A.Step2.S-1 | A2.S1 |
| Equip30A.Step2.EN | A2.End |
| Equip30A.Step3.ST | A3.Start |
| Equip30A.Step3.EN | A3.End |
| Equip30B.Step4.ST | B1.Start |
| Equip30B.Step4.EN | B1.End |
| Equip30B.Step5.ST | B2.Start |
| Equip30B.Step5.EN | B2.End |

| MACHINE NAME | PROCESS NAME | EXPECTED EXECUTION TIME | EXECUTION ORDER | PROCESS INFORMATION | | |
|---|---|---|---|---|---|---|
| | | | | VARIABLE NAME | CONDITION | COMMENT |
| INDUSTRIAL MACHINE 30A | PROCESS A1 | 3 | 1 | A1.Start | IO1.Input1 | START CONDITION IS INPUT/OUTPUT SIGNAL |
| | | | | A1.Abort | A1.Err | |
| | | | | A1.Busy | A1.End VALUE HAS NOT CHANGED FOR 8 SECONDS OR MORE | |
| | | | | A1.End | LAST PROCESSING OF PROCESS PROGRAM PA1 HAS ENDED | |
| | PROCESS A2 | 4 | 2 | A2.Start | A1.End | VARIABLE OF SIGNAL S1 HAS ALSO BEEN SET |
| | | | | A2.Abort | A2.Err | |
| | | | | A2.Busy | A2.End VALUE HAS NOT CHANGED FOR 10 SECONDS OR MORE | |
| | | | | A2.S1 | SIGNAL HAS BEEN RECEIVED FROM SENSOR | |
| | | | | A2.End | LAST PROCESSING OF PROCESS PROGRAM PA2 HAS ENDED | |
| | PROCESS A3 | 3 | 3 | A3.Start | A2.End & A2.S1 | PAY ATTENTION TO START CONDITION |
| | | | | A3.Abort | A3.Err | |
| | | | | A3.Busy | A3.End VALUE HAS NOT CHANGED FOR 6 SECONDS OR MORE | |
| | | | | A3.End | LAST PROCESSING OF PROCESS PROGRAM PA3 HAS ENDED | |
| INDUSTRIAL MACHINE 30B | PROCESS B1 | 4 | 4 | B1.Start | A3.End | PLEASE SPECIFY EXECUTION ORDER SUCH THAT PROCESS IS EXECUTED FOLLOWING PROCESS A3 |
| | | | | B1.Abort | B1.Err | |
| | | | | B1.Busy | B1.End VALUE HAS NOT CHANGED FOR 10 SECONDS OR MORE | |
| | | | | B1.End | LAST PROCESSING OF PROCESS PROGRAM PB1 HAS ENDED | |
| | PROCESS B2 | 2 | 5 | B2.Start | B1.End | NEXT CYCLE MAY BE STARTED WITHOUT WAITING FOR PROCESS B2 TO END |
| | | | | B2.Abort | B2.Err | |
| | | | | B2.Busy | B2.End VALUE HAS NOT CHANGED FOR 6 SECONDS OR MORE | |
| | | | | B2.End | LAST PROCESSING OF PROCESS PROGRAM PB2 HAS ENDED | |

FIG.23

| RECOVERY PROCESS NAME | RECOVERY PROCESS INFORMATION ||| 
|---|---|---|---|
| | EXECUTION ORDER | MACHINE NAME | PROCESS NAME |
| RECOVERY MACRO X | 1 | INDUSTRIAL MACHINE 30A | DOOR OPENING PROCESS |
| | 2 | INDUSTRIAL MACHINE 30A | TOOL CLEARANCE PROCESS |
| | 3 | INDUSTRIAL MACHINE 30A | TOOL RETRACTING PROCESS |
| | 4 | INDUSTRIAL MACHINE 30A | CHUCK OFF PROCESS |
| | 5 | INDUSTRIAL MACHINE 30B | MOVING PROCESS |

| MACHINE NAME | PROCESS INFORMATION | |
| --- | --- | --- |
| | PROCESS NAME | VARIABLE NAME |
| INDUSTRIAL MACHINE 30A | DOOR OPENING PROCESS | A1.Start |
| | | A1.Abort |
| | | A1.Busy |
| | | A1.End |
| | CHUCKING PROCESS | A2.Start |
| | | A2.Abort |
| | | A2.Busy |
| | | A2.End |
| | MACHINING PROCESS | A3.Start |
| | | A3.Abort |
| | | A3.Busy |
| | | A3.End |
| | TOOL CLEARANCE PROCESS | A4.Start |
| | | A4.Abort |
| | | A4.Busy |
| | | A4.End |
| | CHUCK OFF PROCESS | A5.Start |
| | | A5.Abort |
| | | A5.Busy |
| | | A5.End |
| | ⋮ | ⋮ |
| INDUSTRIAL MACHINE 30B | RECOGNIZING PROCESS | B1.Start |
| | | B1.Abort |
| | | B1.Busy |
| | | B1.End |
| | MOVING PROCESS | B2.Start |
| | | B2.Abort |
| | | B2.Busy |
| | | B2.End |
| | GRIPPING PROCESS | B3.Start |
| | | B3.Abort |
| | | B3.Busy |
| | | B3.End |
| | CONVEYING PROCESS | B4.Start |
| | | B4.Abort |
| | | B4.Busy |
| | | B4.End |
| | RELEASE PROCESS | B5.Start |
| | | B5.Abort |
| | | B5.Busy |
| | | B5.End |
| | ⋮ | ⋮ |

PRODUCTION SYSTEM, PRODUCTION METHOD, AND INFORMATION STORAGE MEDIUM

CROSS-REFERENCE TO RELATED APPLICATION

The present disclosure contains subject matter related to that disclosed in Japanese Patent Application JP 2019-226123 filed in the Japan Patent Office on Dec. 16, 2019 the entire contents of which are hereby incorporated by reference.

BACKGROUND OF THE INVENTION

1. Field of the Invention

The embodiments disclosed herein relate to a production system, a production method, and an information storage medium.

2. Description of the Related Art

There has been known a technology in which each of a plurality of processes is executed in a system including a plurality of industrial machines, for example, a programmable logic controller (PLC). For example, in JP 2012-194678 A1, there is described a technology in which a program is created by writing operations of the PLC in a ladder chart.

SUMMARY OF THE INVENTION

According to at least one aspect of the present invention, there is provided a production system including: a plurality of industrial machines each configured to execute a process program for executing a predetermined process, and to perform at least one of refer or change of a machine variable; a controller configured to execute a system program for causing each of the plurality of industrial machines to operate based on an execution order specified for a plurality of predetermined processes, and to perform at least one of refer or change of a system variable; a storage configured to store conversion data for converting between the machine variable of each of the plurality of industrial machines and the system variable; and a circuitry configured to perform conversion between the machine variable of each of the plurality of industrial machines and the system variable based on the conversion data of the each of the plurality of industrial machines, when the controller and each of the plurality of industrial machines communicate to and from each other.

BRIEF DESCRIPTION OF THE DRAWINGS

FIG. 3 is an explanatory diagram for illustrating a procedure for creating a process program.

FIG. 5 is a table for showing a data storage example of a conversion table.

FIG. 6 is a table for showing a data storage example of a conversion table.

FIG. 9 is a table for showing a data storage example of a conversion database.

FIG. 16 is a table for showing a data storage example of a process database.

FIG. 23 is a table for showing a data storage example of a recovery process database.

FIG. 24 is a table for showing a data storage example of a process database in Modification Example (3).

DESCRIPTION OF THE EMBODIMENTS

According to a viewpoint of the inventors of the present invention, when a controller is caused to control each of a plurality of industrial machines executing processes in a predetermined execution order, it is required that programming be performed based on an understanding of variables of each industrial machine. In relation to this point, when each industrial machine and the controller each manage the variables independently, it is no longer required that the controller be aware of the variables specific to each industrial machine during programming of the controller, and programming becomes more efficient. As a result of extensive research and development for converting the variables independently managed by each of a plurality of industrial machines and a controller and operating each industrial machine in a predetermined execution order, the inventors of the present invention have conceived of a novel and original program creation device and the like. A detailed description is now given of the program creation device and the like in at least one embodiment of the present invention.

1. OVERALL CONFIGURATION OF PRODUCTION SYSTEM

Figure 1:
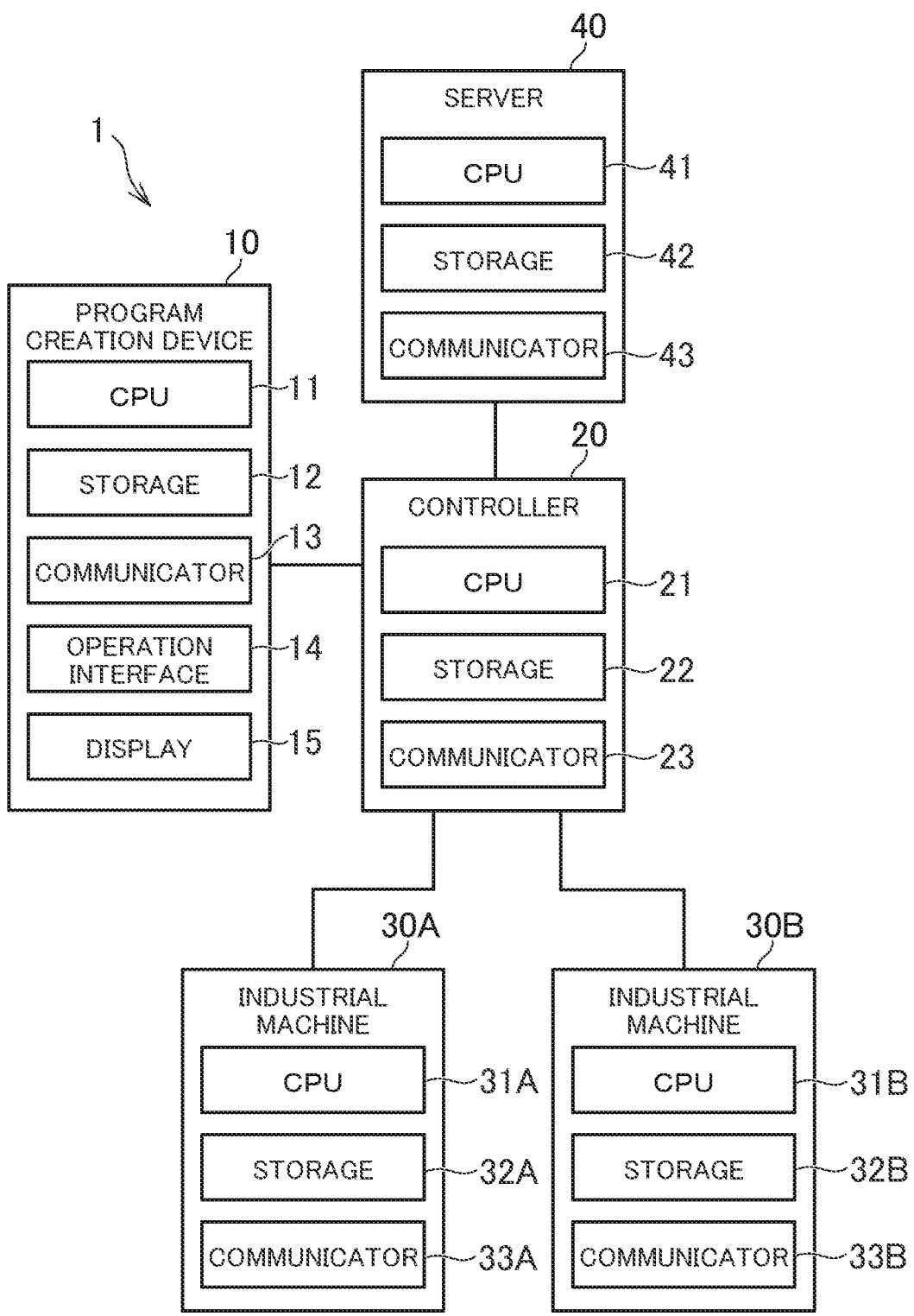
FIG. 1 is a diagram for illustrating an overall configuration of a production system according to at least one embodiment of the present invention.

FIG. 1 is a diagram for illustrating an example of an overall configuration of the production system according to at least one embodiment of the present invention. As illustrated in FIG. 1, a production system 1 includes a program creation device 10, a controller 20, industrial machines 30A and 30B, and a server 40. Each of those components is communicatively connected to each other by using any network, such as an Ethernet (trademark) or a dedicated communication standard for the industrial machines. In the following, when the industrial machines 30A and 30B are not particularly required to be distinguished from one another, the industrial machines 30A and 30B are simply referred to as "industrial machine 30." Similarly, when the CPUs 31A and 31B, the storages 32A and 32B, and the communicators 33A and 33B are not particularly required to be distinguished from one another, the CPUs 31A and 31B are simply referred to as "CPU 31," the storages 32A and 32B are simply referred to as "storage 32," and the communicators 33A and 33B are simply referred to as "communicator 33."

The program creation device 10 is a computer configured to create a program. For example, the program creation device 10 is a personal computer, a mobile terminal (including a tablet terminal), or a cellular phone (including a smartphone). The program creation device 10 includes a CPU 11, a storage 12, a communicator 13, an operation interface 14, and a display 15. The program creation device 10 can also be connected to each of the industrial machine 30 and the server 40 (lines connecting those components are not shown in FIG. 1).

The CPU 11 includes at least one processor. The storage 12 includes a RAM and a hard disk drive, and is configured to store various programs and data. The CPU 11 is configured to execute various types of processing based on those programs and data. The communicator 13 includes a network card and a communication interface, for example, various types of communication connectors, and is configured to communicate to/from other devices. The operation interface 14 is an input device such as a mouse and a keyboard. The display 15 is a liquid crystal display, an organic EL display, or the like, and is configured to display various types of screens in accordance with an instruction from the CPU 11.

The controller 20 is a computer configured to control a plurality of industrial machines 30. For example, the controller 20 may be a computer referred to as "PLC," or a computer having another name having the same function as that of the PLC. For example, the controller 20 and the industrial machine 30 as a whole may be referred to as "cell," which is a unit smaller than a line. In this case, the controller 20 may be referred to as "cell controller."

The controller 20 includes a CPU 21, a storage 22, and a communicator 23. The physical configuration of each of the CPU 21, the storage 22, and the communicator 23 may be the same as that of the CPU 11, the storage 12, and the communicator 13, respectively. The controller 20 may control not only the industrial machine 30 but may also directly control devices that are under the direct control of the controller 20, for example, a robot and motors, and request the server 40 to analyze data showing results of operations of the industrial machine 30.

The industrial machine 30 is a device configured to execute a process. The industrial machine 30 may be any type of device, and is, for example, a robot controller, a lower device of the robot controller, an industrial robot, a motor controller, a lower device of the motor controller, a machine tool, a press machine, or a conveyance machine. The PLC is also a type of industrial machine. The industrial machine 30 includes a CPU 31, a storage 32, and a communicator 33. The physical configuration of each of the CPU 31, the storage 32, and the communicator 33 may be the same as that of the CPU 11, the storage 12, and the communicator 13, respectively.

The industrial machine 30 may also include other physical components. For example, the industrial machine 30 may include an integrated circuit for a specific application, which is referred to as "ASIC." Any physical component may be connected to the industrial machine 30. For example, a machine to be controlled, such as a motor or the like, a sensor for detecting an operation of a motor, a camera for photographing a state of a workpiece to be machined, an input/output device, or another industrial machine may be connected. In at least one embodiment, there is described a case in which the controller 20 controls two industrial machines 30, but the number of industrial machines 30 to be controlled by the controller 20 may be any number. For example, the controller 20 may control one machine, or may control three or more machines.

The server 40 is a server computer. The server 40 includes a CPU 41, a storage 42, and a communicator 43. The physical configuration of each of the CPU 41, the storage 42, and the communicator 43 may be the same as that of the CPU 11, the storage 12, and the communicator 13, respectively. The server 40 collects data indicating results of operations of the controller 20 and the industrial machine 30, and analyzes the operations based on the collected data. The computer configured to collect and analyze the data is not limited to the server 40, and may be another computer. For example, the data may be collected and analyzed by the program creation device 10, another device operated by the user, or another server computer.

The programs and data described as being stored in each of the storages 12, 22, 32, and 42 may be supplied through the network. Moreover, the hardware configuration of each device is not limited to the above-mentioned example, and various types of hardware can be applied. For example, a reader (for example, optical disc drive or memory card slot) configured to read a computer-readable information storage medium and an input/output device (for example, USB terminal) configured to directly connect to an external device may be included. In this case, programs and data stored in the information storage medium may be supplied through the reader or the input/output device.

2. OUTLINE OF PRODUCTION SYSTEM

Firstly, an outline of the production system is described. The program creation device 10 is configured to create a system program for the controller 20 to control a plurality of industrial machines 30. When the controller 20 and the industrial machine 30 as a whole are to be referred to as "cell," the system program may be referred to as "cell program." The system program is a program for controlling an execution order of processes by using variables. The execution order is the order in which the processes are to be executed.

The variable is information indicating that at least one of "refer" or "change" is to be performed when the process is executed. In at least one embodiment, a process program for executing a process is stored in the storage 32 of the industrial machine 30, and the variable indicates that at least one of "refer" or "change" is to be performed by the process program. The term "refer" indicates that a register corresponding to the variable is to be read. The term "change" indicates that the value of the register corresponding to the variable is to be rewritten.

The variable is used as an execution condition of the process, and a variable is prepared for each process. The term "variable" can also be referred to as "information indicating an operation of the industrial machine 30." For example, for each process, a start variable to be used as a process start condition, an abort variable to be used as an abort condition (temporary stop condition), or an end variable to be used as an end condition is prepared. In addition to those examples of the variable, there may be any variable, for example, a variable indicating that the process is in a busy state, a variable indicating an execution result of the process, a variable indicating an interim calculation, a variable indicating a setting of the industrial machine 30, or a variable indicating a detection result of a sensor. The variable may also be referred to as "input/output variable." The variable is referred to by the industrial machine 30 or other devices (for example, the controller 20).

In at least one embodiment, the controller 20 and the industrial machine 30 each manage the variables independently. Therefore, even when the variables are the same, the names managed by the controller 20 and the names managed by the industrial machine 30 are different. In the following, the variables managed by the controller 20 are referred to as "system variables," and the variables managed by the industrial machine 30 are referred to as "machine variables."A system variable is a variable to be identified by the controller 20. For the system variables, at least one of "refer" or "change" is performed by the system program. Meanwhile, a machine variable is a variable to be identified by the industrial machine 30. For the machine variables, at least one of "refer" or "change" is performed by a process program. The names of the machine variables of each industrial machine 30 include a character string for uniquely identifying the process corresponding to the machine variable and a character string which is common to another process.

For example, when the user of the controller 20 and the user of the industrial machine 30 are different from each other, each user sets his or her own variables. The user of the controller 20 can set his or her own system variables without being aware of the machine variables set by the user of the industrial machine 30. The user of the industrial machine 30 can set his or her own machine variables without being aware of the system variables set by the user of the controller 20. The user of the controller 20 and the user of the industrial machine 30 may also be the same.

The term "process" refers to a task or an operation performed by the industrial machine 30. The process may be composed of only one task or operation, or may be composed of a combination of a plurality of tasks or operations. The industrial machine 30 can execute a process depending on any use. For example, as a process, the industrial machine 30 can recognize a workpiece, grip a workpiece, open or close a door, set a workpiece, fix a workpiece to a machine tool, or machine a workpiece by using a machine tool. The industrial machine 30 executes at least one process. The industrial machine 30 may execute only one process or may execute a plurality of processes.

The process program is a program defining the individual procedures in the process. The process program can also be referred to as a program defining the operation of the industrial machine 30. The process program can be created in any language, and is created in, for example, a ladder language or a robot language. The language of the process program may differ depending on the industrial machine 30. For example, the process program of the industrial machine 30A may be described in a ladder language, and the process program of the industrial machine 30B may be described in a robot language. For example, in the process program, a start switch and a coil are written in the ladder chart and conditional branches are written in the source code such that the start variable becomes a condition for starting execution. Further, for example, in the process program, a command is written such that the end variable is changed when the last processing of the process ends. Moreover, for example, in the process program, a command is written such that the abort variable is changed when an abnormality occurs during execution of the process.

In at least one embodiment, a process program is prepared for each process, and the number of processes and the number of process programs is in a one-to-one relationship. Therefore, when a certain industrial machine 30 is to perform "n" ("n" is a natural number) processes, the industrial machine 30 stores at least "n" process programs. The number of processes and the number of process programs is not required to be in a one-to-one relationship. For example, a plurality of processes may be executed by one process program, and a plurality of process programs may be prepared in order to execute one process.

Figure 2:
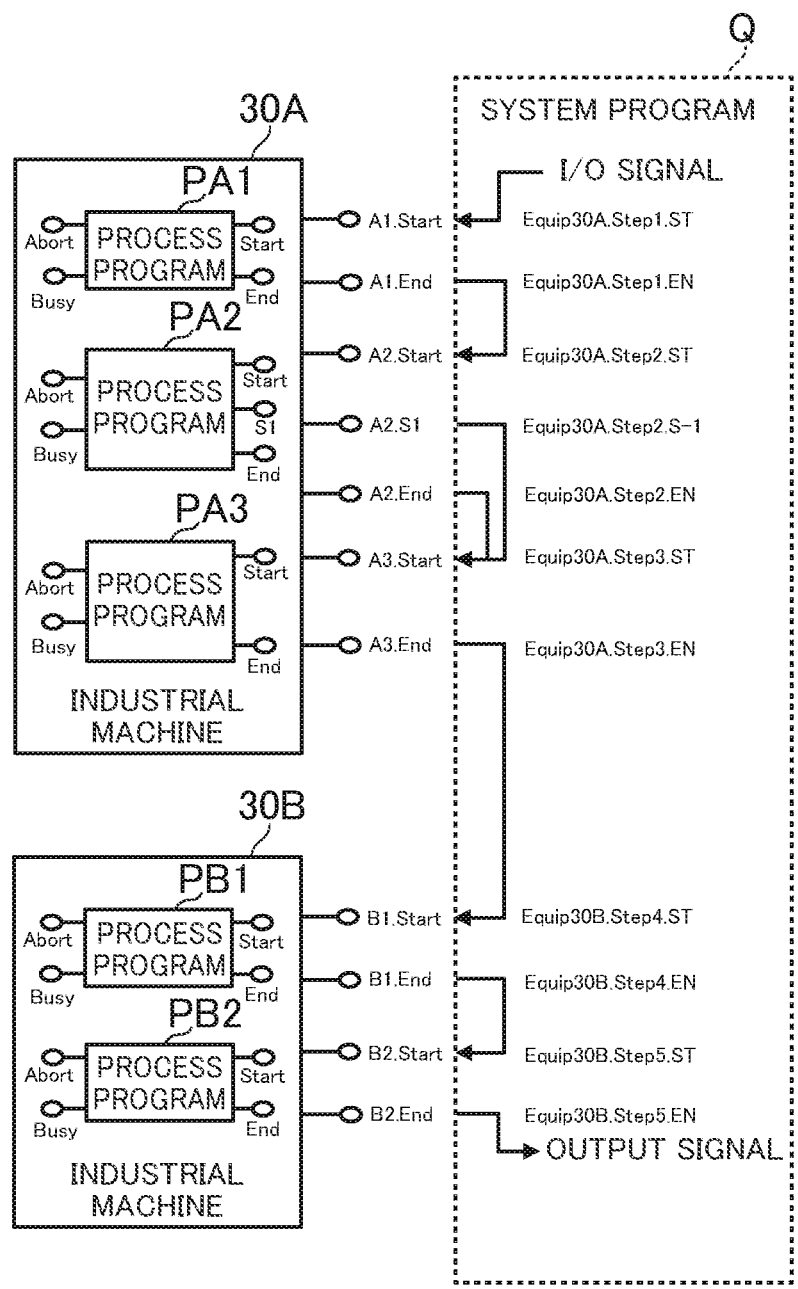
FIG. 2 is a diagram for illustrating a relationship between a system program and process programs.

FIG. 2 is a diagram for illustrating a relationship between a system program and process programs. In at least one embodiment, as an example, there is described a case in which the industrial machine 30A executes three processes, namely, processes A1, A2, and A3, and then the industrial machine 30B executes two processes, namely, processes B1 and B2. As illustrated in FIG. 2, the industrial machine 30A is configured to store process programs PA1, PA2, and PA3 corresponding to processes A1, A2, and A3, respectively. The industrial machine 30B is configured to store process programs PB1 and PB2 corresponding to processes B1 and B2, respectively. In the following, when each of the process programs are not to be distinguished from one another, the process programs are simply referred to as "process program P."

In the example of FIG. 2, a start variable "Start" indicating the start of execution, an abort variable "Abort" indicating abort (pause), a busy variable "Busy" indicating a busy state, and an end variable "End" indicating the end of execution are prepared as the default variables of the process program P. Variables other than those default variables can also be set in the process program P. For example, a variable indicating the value of a predetermined signal or a variable indicating an interim calculation may be set.

In at least one embodiment, there is described a case in which the user operates the program creation device 10 to create the process program P, but the process program P may be created by another computer. For example, when the user of the controller 20 and the user of the industrial machine 30 are different, the process program P is created by a computer other than the program creation device 10. A system program Q is a program for controlling the execution order of the processes, and therefore the process program P is created in advance before the system program Q is created.

FIG. 3 is an explanatory diagram for illustrating a procedure for creating the process program P. Here, as an example, there is described the procedure for creating the process program PA2. As illustrated in FIG. 3, the user creates a process project by using an engineering tool installed in the program creation device 10 (Procedure 1 of FIG. 3). The process project is a management unit of the process program PA2, and any project name can be set, for example, the name of the industrial machine 30 or the name of the process.

When the process project has been created, the user performs the initial setting of the process program PA2 (Procedure 2 of FIG. 3). In the initial setting, basic information on the process program PA2 is set. For example, the name of the industrial machine 30A to execute the process, the type of the process program PA2, and the name of the process are specified. The name of the process is information for uniquely identifying the process in the industrial machine 30. The name of the process may be any character string input by the user, and is set such that the name does not duplicate the name of another process. An expected execution time described later is also specified in Procedure 2.

In Procedure 2 of FIG. 3, default variables are set for the process program PA2 being created. For example, as the default variables of the process program PA2, the start variable "Start," the abort variable "Abort," the busy variable "Busy," and the end variable "End" are set. For example, when the start variable "Start" of the process A2 is changed to a predetermined value, the process program PA2 is executed and the process A2 is started. Further, for example, when all of the commands written in the process program PA2 are executed and the process ends, the end variable "End" of the process A2 is changed to a predetermined value.

In at least one embodiment, default variables are also prepared for the other processes A1 and A3. Therefore, a character string "A2" for identifying the process A2 is given to the name of each variable such that the variable can be identified as being a variable of the process A2. For example, the name of the start variable of the process A2 is "A2.Start," and the name of the end variable of the process A2 is "A2.End." The character string "A2" is also given to the abort variable "Abort" and the busy variable "Busy" (not shown in FIG. 2 and FIG. 3). The variables set when the process program PA2 is created are machine variables. As illustrated in FIG. 3, in at least one embodiment, the names of the machine variables include the name of the process and the name of the default variable.

The user can set another variable besides the default variables. For example, when setting another variable, the user inputs "S1" indicating the name of a predetermined signal in the industrial machine 30A (Procedure 3 of FIG. 3). Like the case of the start variable, for example, the character string "A2" for identifying the process A2 is added such that the name of the another variable is "A2.S1." This variable is also an example of a machine variable.

When the setting of the variables ends, the process program PA2 is programmed (Procedure 4 in FIG. 3), and creation of the process program PA2 is completed. As the programming of the process program PA2 itself, various known methods can be applied. For example, a ladder language or a robot language can be used. Further, when performing the programming and the variable setting, the user may input a comment adding a supplementary explanation.

When the process program PA2 is created, the actual data of the process program PA2 is recorded in the industrial machine 30A. Further, process information storing, for example, the name of the process and the names of the variables specified by the user are registered in a process database of the controller 20. Details of the process information and the process database are described later. The user repeats the creation procedure described above the number of times equal to the number of processes, and creates the process program P and the process information of each process.

In at least one embodiment, when the process programs PA1, PA2, and PA3 are created, it is assumed that the execution order in the industrial machine 30A is specified and stored in the process information. The same applies to the process programs PB1 and PB2, and therefore it is assumed that the execution order in the industrial machine 30B is specified and stored in the process information when those process programs are created. However, whether the processes to be executed by the industrial machine 30A or the processes to be executed by the industrial machine 30B are executed first may be specified when the process programs P is created, or may not be specified when the process programs P is created.

When the user completes the creation of the process programs P and the registration of the process information, the user creates the system program Q. In at least one embodiment, the processes are executed in order of processes A1, A2, A3, B1, and B2, and therefore the user creates the system program Q such that the process programs are executed in the order of process programs PA1, PA2, PA3, PB1, and PB2.

In the example of FIG. 2, the process A1 starts when a predetermined input/output signal is input. For example, the input/output signal is input from an external device, for example, a button arranged on the controller 20 or the industrial machine 30A. When the input/output signal is input, the system program Q changes the machine variable "A1.Start" of the process A to a predetermined value. When written as a system variable, the machine variable becomes "Equip30A.Step1.ST." In this way, the system variable in at least one embodiment includes "Equip30A" indicating the name of the industrial machine 30 A, "Step1" indicating the execution order of the process, and "ST" indicating the type of the variable, and is given a name based on a rule different from that of the machine variable. As illustrated in FIG. 2, the other variables are also given a system variable name based on the same rule.

For example, when creating the system program Q, the user creates a conversion table for converting between the system variables and the machine variables, and stores the conversion table in the controller 20. A conversion table is created for each industrial machine 30. The system program Q converts the system variable "Equip30A.Step1.ST" to the machine variable "A1.Start" based on the conversion table of the industrial machine 30A, and changes the machine variable to a predetermined value. When the machine variable "A1.Start" becomes the predetermined value, the process program PA1 is executed and the process A1 starts.

When the process A1 ends normally, the machine variable "A1.End" of the process A1 becomes a predetermined value, and the controller 20 is notified to that effect. The system program Q converts the machine variable "A1.End" to the system variable "Equip30A.Step1.EN" based on the conversion table of the industrial machine 30A, and detects that the system variable has become the predetermined value. The system program Q converts the system variable "Equip30A.Step2.ST" to the machine variable "A2.Start" based on the conversion table of the industrial machine 30A, and changes the machine variable to a predetermined value.

When the machine variable "A2.Start" becomes the predetermined value, the process program PA2 is executed and the process A2 starts.

When the process A2 ends normally, the machine variables "A2.S1" and "A2.End" of the process A2 each become a predetermined value, and the controller 20 is notified to that effect. The system program Q converts the machine variables "A2.S1" and "A2.End" to the system variables "Equip30A.Step2.S-1" and "Equip30A.Step2.EN," respectively, based on the conversion table of the industrial machine 30A, and detects that the system variables each have become the predetermined value. The system program Q converts the system variable "Equip30A.Step3.ST" to the machine variable "A3.Start" based on the conversion table of the industrial machine 30A, and changes the machine variable "A3.Start" to a predetermined value. When the machine variable "A3.Start" becomes the predetermined value, the process program PA3 is executed and the process A3 starts.

When the process A3 ends normally, the machine variable "A3.End" of the process A3 becomes a predetermined value, and the controller 20 is notified to that effect. The system program Q converts the machine variable "A3.End" to the system variable "Equip30A.Step3.EN" based on the conversion table of the industrial machine 30A, and detects that the system variable has become the predetermined value. The system program Q converts the system variable "Equip30B.Step4.ST" to the machine variable "B1.Start" based on the conversion table of the industrial machine 30B, and changes the machine variable to a predetermined value. When the machine variable "B1.Start" becomes the predetermined value, the process program PB1 is executed and the process B1 starts.

When the process B1 ends normally, the end variable "B1.End" of the process B1 becomes a predetermined value, and the controller 20 is notified to that effect. The system program Q converts the machine variable "B1.End" to the system variable "Equip30B.Step4.EN" based on the conversion table of the industrial machine 30B, and detects that the system variable has become the predetermined value. The system program Q converts the system variable "Equip30B.Step5.ST" to the machine variable "B2.Start" based on the conversion table of the industrial machine 30B, and changes the machine variable to a predetermined value. When the machine variable "B2.Start" becomes the predetermined value, the process program PB2 is executed and the process B2 starts.

When the process B2 ends normally, the end variable "B2.End" of the process B2 becomes a predetermined value, and the controller 20 is notified to that effect. The system program Q converts the machine variable "B2.End" to the system variable "Equip30B.Step5.EN" based on the conversion table of the industrial machine 30B, and detects that the system variable has become the predetermined value. The system program Q outputs a predetermined output signal, and all processes of the first cycle are completed. The output signal may be a signal to the controller 20 or the industrial machine 30, or may be a signal to a device such as an external sensor or an LED light.

The system variables and the machine variables are changed to the initial values at any timing, for example, at the end of a cycle or after the end of each process. The second cycle may be started after the end of the first cycle or may be started at a point during the first cycle. When the start timing of the second cycle arrives, the system program Q changes the machine variable "A1.Start" of the process A1 to a predetermined value based on the conversion table of the industrial machine 30A, and the processes of the second cycle start. After that, each process is periodically executed in the same manner as in the first cycle.

As described above, the production system 1 of at least one embodiment has a configuration in which variables independently managed by each of a plurality of industrial machines 30 and the controller 20 are converted, and each industrial machine 30 is operated in a predetermined execution order. The details of the configuration are now described.

3. FUNCTIONS TO BE IMPLEMENTED IN PRODUCTION SYSTEM

Figure 4:
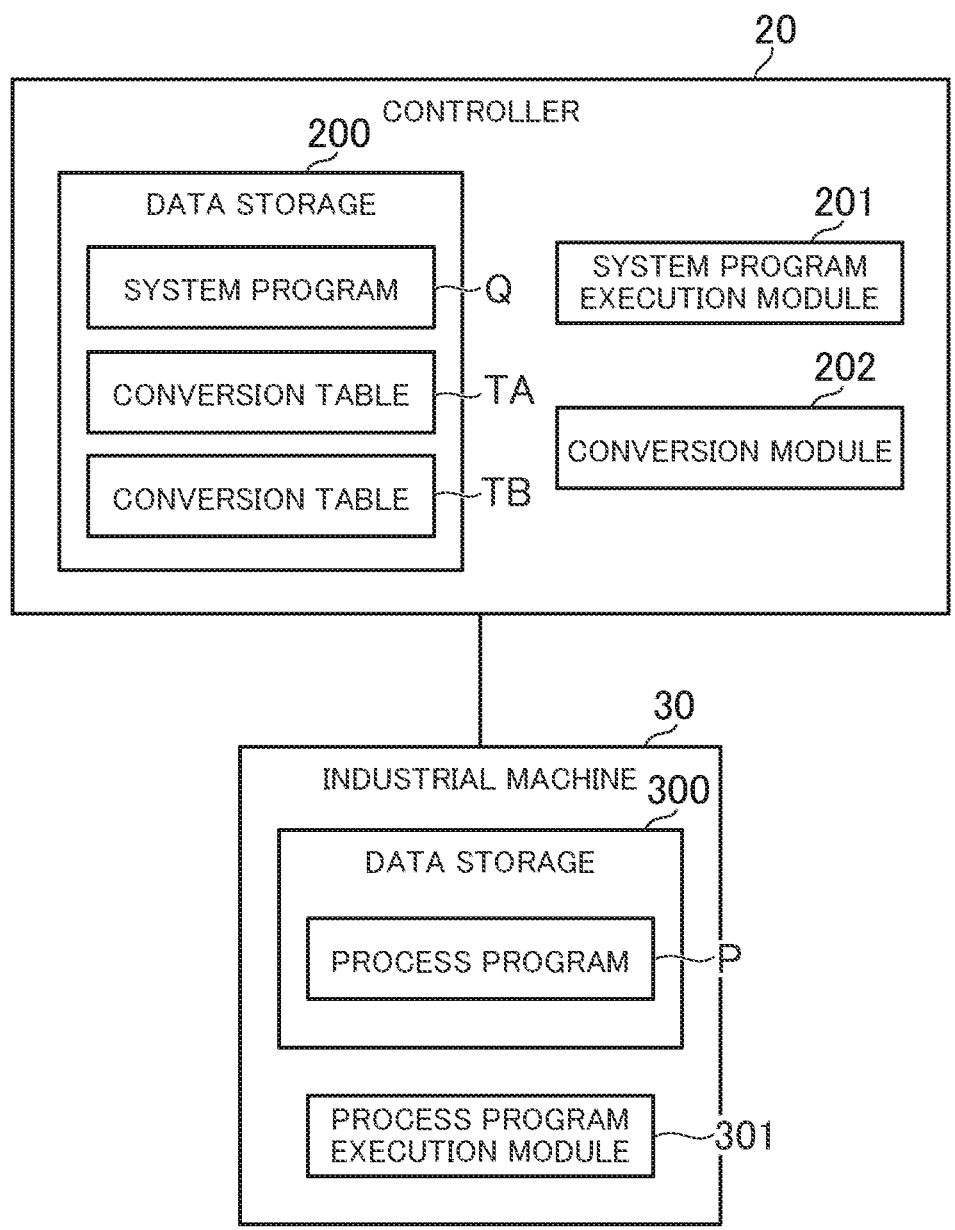
FIG. 4 is a functional block diagram for illustrating functions to be implemented in the production system.

FIG. 4 is a functional block diagram for illustrating functions to be implemented in the production system 1. In at least one embodiment, the functions to be implemented by each of the controller 20 and the industrial machine 30 are described. The same functions are implemented in each of the industrial machines 30A and 30B, and therefore the industrial machines 30A and 30B are illustrated as one industrial machine 30 in FIG. 4.

3-1. FUNCTIONS TO BE IMPLEMENTED IN CONTROLLER

As illustrated in FIG. 4, in the controller 20, a data storage 200, a system program execution module 201, and a conversion module 202 are implemented. The controller 20 executes the system program Q for operating each industrial machine 30 in the execution order specified for the plurality of processes to perform at least one of "refer" or "change" of the system variable.

[Data Storage]

The data storage 200 is mainly implemented by the storage 22. The data storage 200 is configured to store the data required in order to control the industrial machine 30. For example, the data storage 200 stores the system program Q. The system program Q stored in the data storage 200 is created by the program creation device 10. Further, for example, the data storage 200 may store information on the name and an IP address, for example, of each of the industrial machines 30A and 30B to be controlled by the controller 20.

Further, for example, the data storage 200 may store the values of the system variables corresponding to the machine variables of each industrial machine 30. It is assumed that consistency is periodically achieved between the system variables and the machine variables. When a machine variable has been changed, the corresponding system variable is also changed. At that time, the machine variable is converted to the system variable by the conversion module 202 described later. Moreover, the system variable may be changed first. In this case, the conversion module 202 converts the system variable to the machine variable, and the machine variable is changed.

Further, for example, the data storage 200 stores a conversion table TA of the industrial machine 30A and a conversion table TB of the industrial machine 30B. In the following, when the conversion tables TA and TB are not particularly required to be distinguished from one another, the conversion tables TA and TB are simply referred to as "conversion table T."

FIG. 5 is a table for showing a data storage example of the conversion table TA. FIG. 6 is a table for showing a data storage example of the conversion table TB. As shown in FIG. 5 and FIG. 6, in the conversion table TA, system variables and the machine variables of the industrial machine 30A are associated with each other, and in the conversion table TB, system variables and the machine variables of the industrial machine 30B are associated with each other. For example, the conversion tables TA and TB may be created by the user when the system program Q is created, or may be created by the user when the process program P is created.

The conversion table T is an example of conversion data for converting between the machine variables of each industrial machine 30 and the system variables. In at least one embodiment, the data storage 200 stores a different conversion table T for each industrial machine 30 as the conversion data. The number of prepared conversion tables T is equal to the number of industrial machines 30. That is, the conversion tables T and the industrial machines 30 correspond to each other on a one-to-one basis. In at least one embodiment, the term "conversion table T" can be read as "conversion data." The conversion data is data for converting the machine variables of each industrial machine 30 and the system variables to each other. In other words, the conversion data is data in which the machine variables of each industrial machine 30 and the system variables are associated with each other. The conversion data can also be said to be data showing a correspondence relationship between the machine variables and the system variables. The conversion data can be used to search for the system variable corresponding to a machine variable and the machine variable corresponding to a system variable.

The conversion data is not limited to data having a table format, and may be data having any format. For example, as in the modification examples described later, in place of having a separate table for each industrial machine 30, the conversion data may be included in a single database showing the relationship between the machine variables of a plurality of industrial machines 30 and the system variables. As another example, when the relationship between the machine variables and the system variables is described as a part of a program code, the conversion data may be written as a conversion program for converting between those variables. Further, for example, the conversion data may have any data format, including a CSV format or a text format. The data storage 200 functions as a conversion data storage by storing the conversion tables T.

[System Program Execution Module]

The system program execution module 201 is mainly implemented by the CPU 21. The system program execution module 201 is configured to control the process execution order based on the system program Q. For example, the system program execution module 201 transmits a start instruction of each process to each industrial machine 30 such that the industrial machines 30 operate in the execution order specified by the user.

In at least one embodiment, the execution start of the processes is controlled by the start variable. Therefore, the system program execution module 201 causes the conversion module 202, which is described later, to convert the start variable written as a system variable to a machine variable, and to transmit to the industrial machine 30 an instruction to change the converted machine variable. Further, in at least one embodiment, the end of a process is detected based on the end variable. Therefore, the system program execution module 201 causes the conversion module 202, which is described later, to convert the end variable written as a machine variable to a system variable, and detects the end of the process based on the value of the converted system variable. In order to start the next process, the system program execution module 201 uses the conversion module 202 to change the start variable of the next process. After that, the execution order of processes is controlled by the same processing. The same applies to the detection of an abnormality in a process and to detection of a busy state. The detection of an abnormality in a process and the detection of a busy state can be performed by converting the abort variable or the busy variable written as machine variables to system variables.

[Conversion Module]

The conversion module 202 is mainly implemented by the CPU 21. The conversion module 202 is configured to perform, when the controller 20 and each industrial machine 30 communicate to and from each other, conversion between the machine variables of an industrial machine 30 and the system variables based on the conversion table T of the industrial machine 30. In at least one embodiment, a conversion table T is prepared for each industrial machine 30, and therefore the conversion module 202 performs conversion between the machine variables of the industrial machines 30 and the system variables based on the conversion table T of each industrial machine 30.

The expression "when the controller 20 and each industrial machine 30 communicate to and from each other" refers to cases in which the controller 20 transmits information to the industrial machine 30 or the industrial machine 30 transmits information to the controller 20. The expression "performs conversion between the machine variables and the system variables" refers to converting a machine variable to a system variable or a system variable to a machine variable. As used herein, "conversion" refers to identifying another associated variable. Identifying another variable means identifying the name of the variable or identifying a register corresponding to the variable.

For example, the conversion module 202 converts, based on the conversion table T of the industrial machine 30 to serve as a communication partner of the controller 20, the system variable to the machine variable of the industrial machine 30, and transmits the converted machine variable. In this case, the "communication partner of the controller 20" is the industrial machine 30 to which the information is to be transmitted. When the controller 20 transmits some kind of instruction to the industrial machine 30, the conversion module 202 refers to the conversion table T of the industrial machine 30 from among the conversion tables T stored in the data storage 200, converts the system variable to the machine variable, and transmits the converted machine variable.

Further, for example, the conversion module 202 converts, based on the conversion table T of the industrial machine 30 to serve as the communication partner of the controller 20, the machine variable received from the industrial machine 30 to the system variable. In this case, the "communication partner of the controller 20" is the industrial machine 30 transmitting a response. When the controller 20 receives some kind of response from the industrial machine 30, the conversion module 202 refers to the conversion table T of the industrial machine 30 from among the conversion tables T stored in the data storage 200, converts the machine variable to the system variable, and transmits the converted system variable.

3-2. FUNCTIONS TO BE IMPLEMENTED IN INDUTRIAL MACHINE

As illustrated in FIG. 4, in the industrial machine 30, a data storage 300 and a process program execution module 301 are implemented. Each of the plurality of industrial machines 30 executes a process program P for executing a predetermined process, and performs at least one of "refer" or "change" of the machine variable.

[Data Storage]

The data storage 300 is mainly implemented by the storage 32. The data storage 300 is configured to store the data required for the industrial machine 30 to execute each process. For example, the data storage 300 stores the process program P. In at least one embodiment, process information is prepared for each process program P, and therefore the data storage 300 may store the process program P and the process information in association with each other. Further, the data storage 300 stores the value of the machine variable of each process. As described above, the machine variables of the data storage 300 and the system variables of the data storage 200 are consistent with each other. Moreover, the data storage 300 may store, for example, parameters for controlling the motor and teaching data of the robot.

[Process Program Execution Module]

The process program execution module 301 is mainly implemented by the CPU 31. The process program execution module 301 is configured to execute each process based on the process program P and the variables stored in the data storage 300. For example, the start variable written as the machine variable is changed to a predetermined value based on an instruction received from the controller 20, and the process program execution module 301 starts the process when the change is detected. Further, for example, when the last processing described in the process program P has ended, the process program execution module 301 changes the end variable written as a machine variable to a predetermined value. The end variable written as a machine variable is converted to the system variable by the conversion module 202, and the system program execution module 201 detects that the process has ended. After that, the start variable of the next process (start variable written as a machine variable) is changed to a predetermined value, and the process program execution module 301 starts executing the process program P of the next process. After that, each process is executed in sequence by the same processing.

4. PROCESSING TO BE EXECUTED IN PRODUCTION SYSTEM

Figure 7:
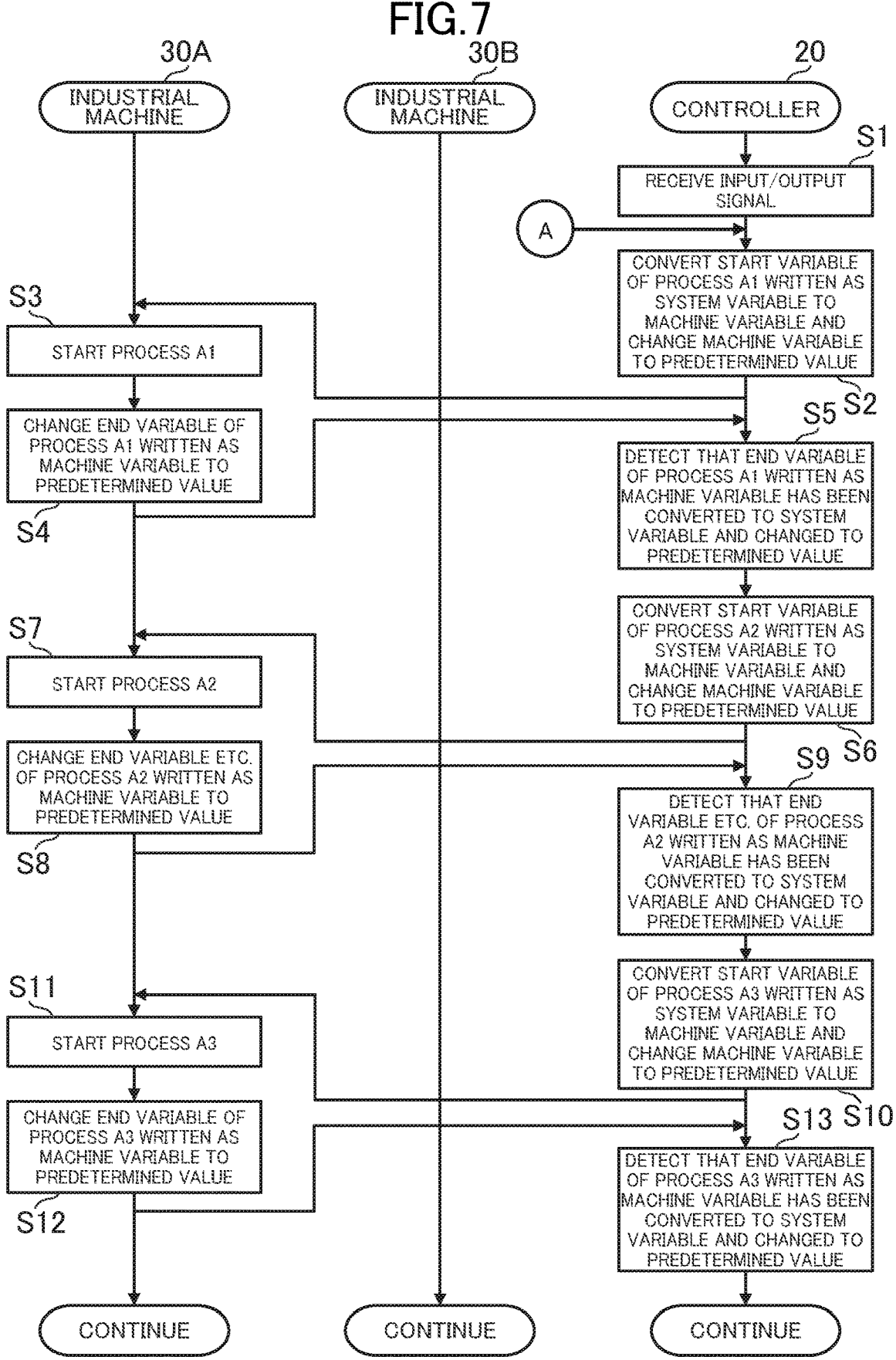
FIG. 7 is a flowchart for illustrating an example of processing to be executed in the production system.
Figure 8:
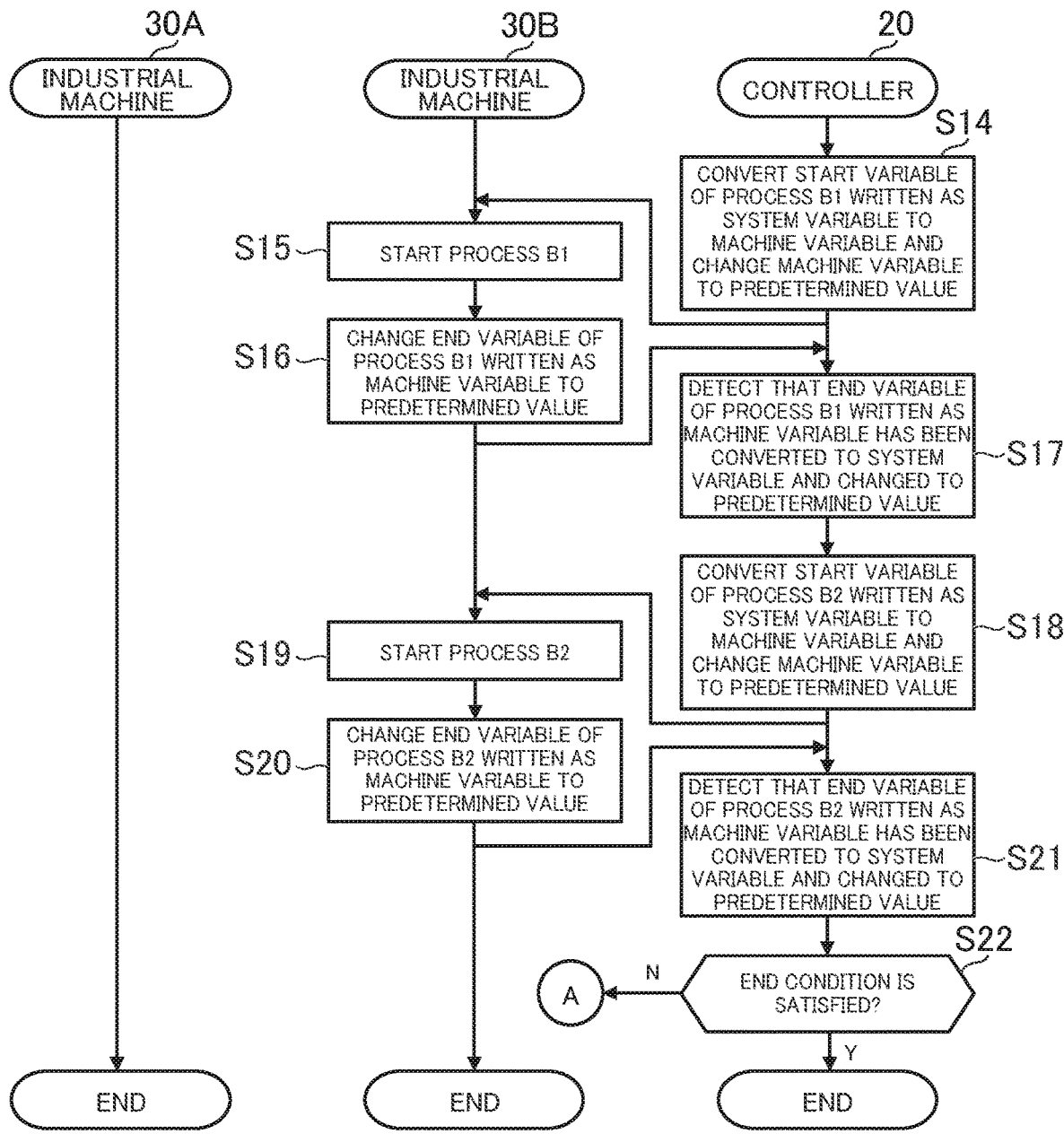
FIG. 8 is a flowchart for illustrating an example of processing to be executed in the production system.

FIG. 7 and FIG. 8 are flowcharts for illustrating an example of processing to be executed by the production system 1. The processing illustrated in FIG. 7 and FIG. 8 is executed by the CPU 21 operating in accordance with the system program Q stored in the storage 22 and the CPU 31 operating in accordance with the process program P stored in the storage 32. The processing illustrated in FIG. 7 and FIG. 8 is an example of processing to be executed by the functional blocks illustrated in FIG. 4. In at least one embodiment, as an example, there is described processing in a case where the processes illustrated in FIG. 2 are to be executed. It is assumed that the system variables stored in the storage 22 of the controller 20 and the machine variables stored in the storage 32 of the industrial machine 30 are each set to the initial values.

As illustrated in FIG. 7, when the controller 20 receives an input/output signal serving as a start condition of the first cycle (Step S1), the controller 20 converts the start variable "Equip30A.Step1.ST" of the process A1 written as a system variable to the machine variable "A1.Start" based on the conversion table TA of the industrial machine 30A, and changes the machine variable "A1.Start" to a predetermined value (Step S2). In Step S2, the controller 20 converts the system variable "Equip30A.Step1.ST" to the machine variable "A1.Start" and transmits an instruction to change the machine variable to the predetermined value.

When the industrial machine 30A receives the instruction from the controller 20, the industrial machine 30A changes the start variable "A1.Start" of the process A1 written as a machine variable to a predetermined value, and starts the process A1 (Step S3). In Step S3, the process program PA1 monitors the machine variable "A1.Start," and when the process program PA1 detects that the value of the machine variable "A1.Start" has become the predetermined value, the process program PA1 executes the command written first and starts the process A1.

When the process A1 ends, the industrial machine 30A changes the end variable "A1.End" of the process A1 written as a machine variable to a predetermined value (Step S4). In Step S4, the industrial machine 30A notifies the controller 20 that the machine variable "A1.End" has been changed to the predetermined value.

The controller 20 detects that the end variable "A1.End" of the process A1 written as a machine variable has been converted to the system variable "Equip30A.Step1.EN" based on the conversion table TA of the industrial machine 30A and changed to a predetermined value (detects that the process A1 has ended) (Step S5).

The controller 20 converts the start variable "Equip30A.Step2.ST" of the process A1 written as a system variable to the machine variable "A2.Start" based on the conversion table TA of the industrial machine 30A, and changes the machine variable "A2.Start" to a predetermined value (Step S6). In Step S6, the controller 20 converts the system variable "Equip30A.Step2.ST" to the machine variable "A2.Start" and transmits an instruction to change the machine variable to the predetermined value.

When the industrial machine 30A receives the instruction from the controller 20, the industrial machine 30A changes the start variable "A2.Start" of the process A2 written as a machine variable to a predetermined value, and starts the process A2 (Step S7). In Step S7, the process program PA2 monitors the machine variable "A2.Start," and when the process program PA2 detects that the value of the machine variable "A2.Start" has become the predetermined value, the process program PA2 executes the command written first and starts the process A2.

When the process A2 ends, the industrial machine 30A changes the variable "A2.S1" and the end variable "A2.End" of the process A2 written as a machine variable to predetermined values (Step S8). The variable "A2.S1" may be changed to a predetermined value before the end of the process A2. In Step S8, the industrial machine 30A notifies the controller 20 that the machine variables "A2.S1" and "A2.End" have been changed to the predetermined value.

The controller 20 detects that the variable "A2.S1" and the end variable "A2.End" of the process A2 written as machine variables have been converted to the system variables "Equip30A.Step2.S-1" and "Equip30A.Step2.EN" based on the conversion table TA of the industrial machine 30A and changed to predetermined values (detects that the process A2 has ended) (Step S9).

The controller 20 converts the start variable "Equip30A.Step3.ST" of the process A3 written as a system variable to the machine variable "A3.Start" based on the conversion table TA of the industrial machine 30A, and changes the machine variable "A3.Start" to a predetermined value (Step S10). In Step S10, the controller 20 converts the system variable "Equip30A.Step3.ST" to the machine variable "A3.Start" and transmits an instruction to change the machine variable to the predetermined value.

When the industrial machine 30A receives the instruction from the controller 20, the industrial machine 30A changes the start variable "A3.Start" of the process A3 written as a machine variable to a predetermined value, and starts the process A3 (Step S11). In Step S11, the process program PA3 monitors the machine variable "A3.Start," and when the process program PA3 detects that the value of the machine variable "A3.Start" has become the predetermined value, the process program PA3 executes the command written first and starts the process A3.

When the process A3 ends, the industrial machine 30A changes the end variable "A3.End" of the process A3 written as a machine variable to a predetermined value (Step S12). In Step S12, the industrial machine 30A notifies the controller 20 that the machine variable "A3.End" has been changed to the predetermined value.

The controller 20 detects that the end variable "A3.End" of the process A3 written as a machine variable has been converted to the system variable "Equip30A.Step3.EN" based on the conversion table TA of the industrial machine 30A and changed to a predetermined value (detects that the process A3 has ended) (Step S13).

Referring next to FIG. 8, the controller 20 converts the start variable "Equip30B.Step4.ST" of the process B1 written as a system variable to the machine variable "B1.Start" based on the conversion table TB of the industrial machine 30B, and changes the machine variable "B1.Start" to a predetermined value (Step S14). In Step S14, the controller 20 converts the system variable "Equip30B.Step4.ST" to the machine variable "B1.Start" and transmits an instruction to change the machine variable to the predetermined value.

When the industrial machine 30B receives the instruction from the controller 20, the industrial machine 30B changes the start variable "B1.Start" of the process B1 written as a machine variable to a predetermined value, and starts the process B1 (Step S15). In Step S15, the process program PB1 monitors the machine variable "B1.Start," and when the process program PB1 detects that the value of the machine variable "B1.Start" has become the predetermined value, the process program PB1 executes the command written first and starts the process B1.

When the process B1 ends, the industrial machine 30B changes the end variable "B1.End" of the process B1 written as a machine variable to a predetermined value (Step S16). In Step S16, the industrial machine 30B notifies the controller 20 that the machine variable "B1.End" has been changed to the predetermined value.

The controller 20 detects that the end variable "B1.End" of the process B1 written as a machine variable has been converted to the system variable "Equip30B.Step4.EN" based on the conversion table TB of the industrial machine 30B and changed to a predetermined value (detects that the process B1 has ended) (Step S17).

The controller 20 converts the start variable "Equip30B.Step5.ST" of the process B2 written as a system variable to the machine variable "B2.Start" based on the conversion table TB of the industrial machine 30B, and changes the machine variable "B2.Start" to a predetermined value (Step S18). In Step S18, the controller 20 converts the system variable "Equip30B.Step5.ST" to the machine variable "B2.Start" and transmits an instruction to change the machine variable to the predetermined value.

When the industrial machine 30B receives the instruction from the controller 20, the industrial machine 30B changes the start variable "B2.Start" of the process B2 written as a machine variable to a predetermined value, and starts the process B2 (Step S19). In Step S19, the process program PB2 monitors the machine variable "B2.Start," and when the process program PB2 detects that the value of the machine variable "B2.Start" has become the predetermined value, the process program PB2 executes the command written first and starts the process B2.

When the process B2 ends, the industrial machine 30B changes the end variable "B2.End" of the process B2 written as a machine variable to a predetermined value (Step S20). In Step S20, the industrial machine 30B notifies the controller 20 that the machine variable "B2.End" has been changed to the predetermined value.

The controller 20 detects that the end variable "B2.End" of the process B2 written as a machine variable has been converted to the system variable "Equip30B.Step5.EN" based on the conversion table TB of the industrial machine 30B and changed to a predetermined value (detects that the process B2 has ended) (Step S21). After that, a predetermined signal is output.

The controller 20 determines whether or not the predetermined end condition is satisfied (Step S22). The end condition is a condition for ending the cycle, and any condition can be set, for example, the user performing a predetermined operation or the arrival of a predetermined date and time. When it is not determined that the end condition is satisfied (Step S22: N), the processing returns to Step S2, and the next cycle is started. Meanwhile, when it is determined that the end condition is satisfied (Step S22: Y), the processing ends.

According to the production system 1 of at least one embodiment, in a case where the controller 20 and each industrial machine 30 communicate to and from each other, even when the industrial machines 30 and the controller 20 each manage their own variables including machine variables and system variables, each industrial machine 30 can be operated in a specified execution order for a plurality of processes by converting the machine variables of the industrial machine 30 and the system variables based on the conversion table T of the industrial machine 30. For example, even when the creator of the system program Q and the creator of the process program P are different and each creator designs the program based on his or her own variables, the conversion table T absorbs the differences in the variables and the programs can be designed more easily.

Further, through managing the conversion table T and converting the variables on the controller 20 side, it is possible to eliminate the requirement to add changes to the existing industrial machine 30 side. Moreover, even when changes are required to be added to the existing industrial machine 30, those changes can be kept to a minimum. Therefore, assets, for example, the process programs P, created on the industrial machine 30 side can be used as they are as much as possible. Further, it is not required to manage the conversion table T or convert the variables on the industrial machine 30 side, and therefore the processing load on the industrial machine 30 and memory consumption can also be reduced. Therefore, for example, even when a low-specification industrial machine 30 is used, the possibility of interfering with the operation of the industrial machine 30 can be reduced.

Further, through storing a different conversion table T for each industrial machine 30 as the conversion data, management of the conversion data can be simplified.

Moreover, the names of the machine variables of each industrial machine 30 include a character string for uniquely identifying the process and a character string common to other processes. As a result, there is a pattern to the naming system of the machine variables, which enables the names of the machine variables to be understood more easily and programming to be simplified.

5. MODIFICAITON EXAMPLES

The present invention is not limited to at least one embodiment described above, and can be modified suitably without departing from the spirit of the present invention.

(1) For example, in place of storing a separate conversion table T for each industrial machine 30, the data storage 200 may store a conversion database in which the conversion data of each industrial machine 30 is stored. FIG. 9 is a table for showing a data storage example of a conversion database DB1. As shown in FIG. 9, the conversion database DB1 is a database for collectively managing individual pieces of conversion data. For example, in the conversion database DB1, the system variables and the machine variables of each industrial machine 30 are associated with each other. The conversion database DB1 can also be said to be data for collectively managing the conversion tables T described in at least one embodiment.

The conversion module 202 performs conversion between the machine variables of the industrial machine 30 and the system variables based on the conversion data of each industrial machine 30 stored in the conversion database DB1. The conversion module 202 refers to the conversion database DB1, and performs conversion between the machine variables of the industrial machine 30 and the system variables based on the conversion data associated with the industrial machine 30 serving as the communication partner. The method of converting the variables after the conversion data is acquired is as described in at least one embodiment.

According to Modification Example (1) of the present invention, the conversion data of each industrial machine 30 can be collectively managed based on the conversion database DB1.

(2) Further, for example, the program creation device 10 may include an engineering tool for simplifying the creation of the system program Q. When the engineering tool is started in the program creation device 10, a schedule screen for specifying the execution order of the processes and creating the system program Q is displayed on the display 15.

Figure 10:
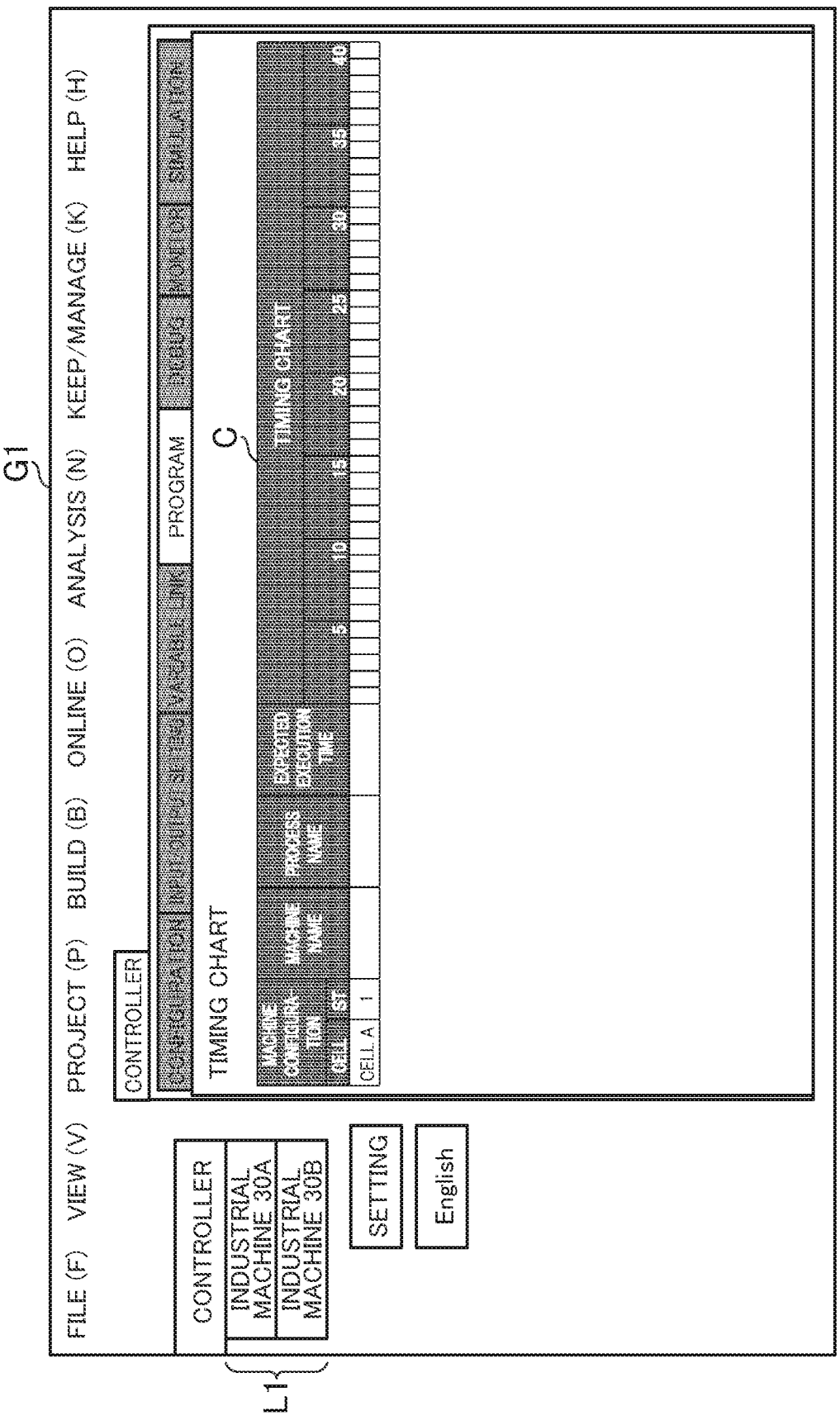
FIG. 10 is a diagram for illustrating an example of a schedule screen.

FIG. 10 is a diagram for illustrating an example of a schedule screen. As illustrated in FIG. 10, a schedule screen G1 is a screen including various user interfaces supporting user tasks. The schedule screen G1 may be configured such that, for example, setting or simulation of the variables can be performed in addition to program creation. For example, a timing chart C for specifying the execution order of the process is displayed on the schedule screen G1.

For example, in the timing chart C, a timing axis (time axis) is set in the right direction (horizontal direction). As the screen is moved farther to the right, that means the later time. Further, in the timing chart C, numerical values are displayed at regular time intervals (in the case of FIG. 10, at intervals of 5 seconds), and squares indicating unit times (in the case of FIG. 10, 1 second) are arranged. In the example of FIG. 10, for example, five squares are arranged between 0 seconds to 5 seconds.

The user specifies, in the timing chart C, the execution order of the processes to be executed by the industrial machine 30, and creates the system program Q. In the example of FIG. 10, the user has not yet specified the industrial machine 30, and information on the processes is not displayed in the timing chart C.

For example, on the schedule screen G1, a list L1 showing the names of the industrial machines 30 to be controlled by the controller 20 is displayed. In Modification Example (2) of the present invention, the industrial machines 30A and 30B are the industrial machines to be controlled, and therefore the names of those two machines are displayed in the list L1. For example, when the user drags and drops the name of the industrial machine 30A from the list L1 to the timing chart C, information on the processes A1, A2, and A3 to be executed by the industrial machine 30A is displayed in the timing chart C.

Figure 11:
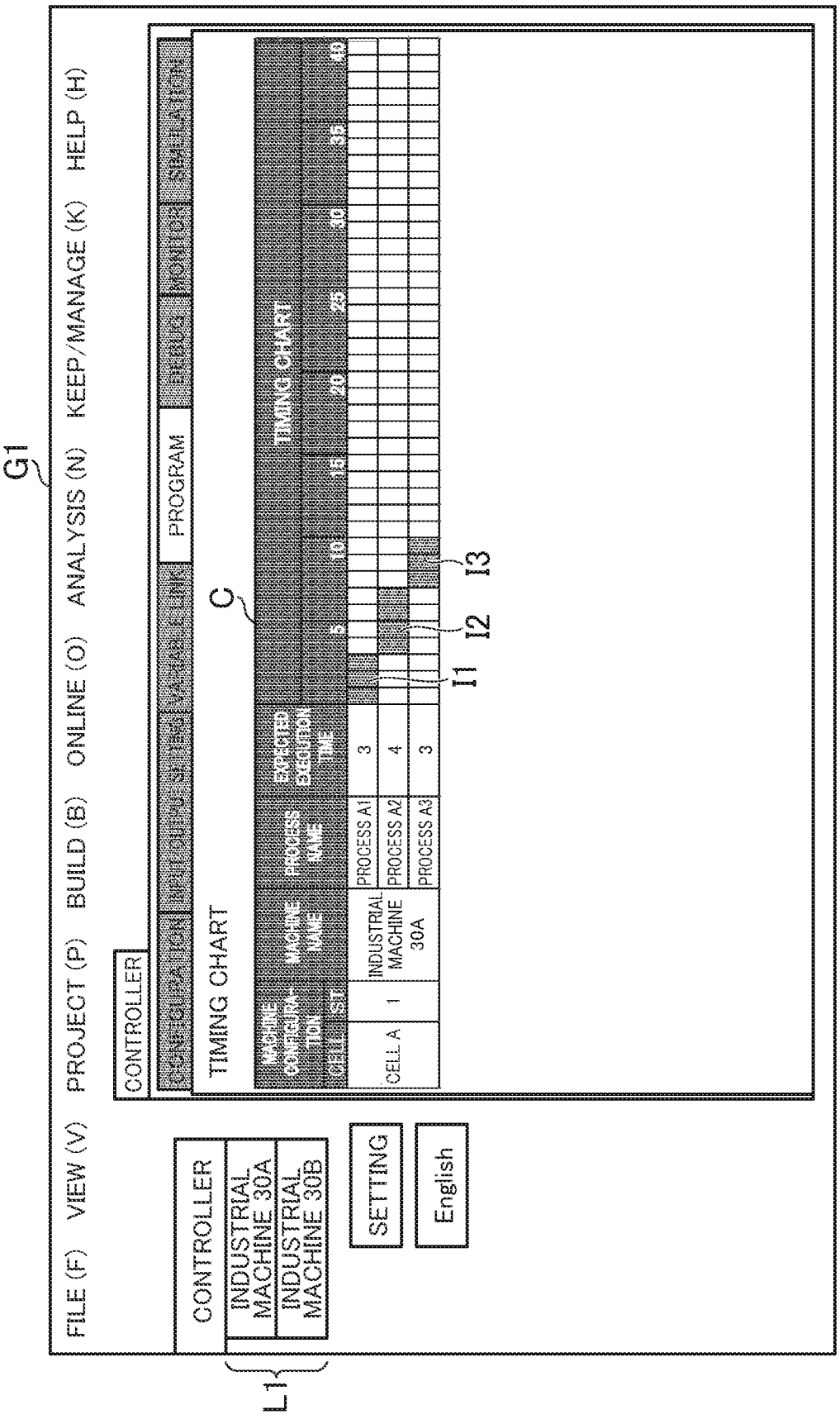
FIG. 11 is a diagram for illustrating an example of a timing chart at a time when a name of an industrial machine is dragged and dropped.

FIG. 11 is a diagram for illustrating an example of the timing chart C at a time when the name of the industrial machine 30A is dragged and dropped. As illustrated in FIG. 11, the name of the industrial machine 30A, the names of each of the processes A1, A2, and A3, and an expected execution time set for each process are displayed in the timing chart C. Further, other information included in the process information (for example, the name of a variable or the execution order in the industrial machine 30A) may be displayed in the timing chart C.

The expected execution time is the expected time period required to execute each process. In Modification Example (2), there is described a case in which the expected execution time is defined in units of 1 second, but the expected execution time may be defined in other units, for example, of 2 seconds or 0.5 second. In the example of FIG. 11, the expected execution times of the processes A1, A2, and A3 are 3 seconds, 4 seconds, and 3 seconds, respectively. In the example of FIG. 11, the time required to shift from one process to the next process is not taken into consideration, but as described later, the time between processes may be taken into consideration.

In Modification Example (2), the execution order of the processes A1, A2, and A3 in the industrial machine 30 is specified in advance, and therefore the names of those processes are arranged and displayed in the timing chart C in the execution order from top to bottom. Through arranging the names of each process in the execution order, the user can intuitively grasp the execution order of those processes.

Further, in the timing chart C, process images I1, I2, and I3 representing the processes A1, A2, and A3, respectively, are arranged and displayed in the execution order on the timing axis. For example, the expected execution time of the process A1 is 3 seconds, and the process image I1 is displayed so as to fill the three squares from 1 second to 3 seconds in the row of the process A1 in a predetermined color. The expected execution time of the process A2 is 4 seconds, and the process image I2 is displayed so as to fill the four squares from 4 seconds to 7 seconds in the row of the process A2. The expected execution time of the process A3 is 3 seconds, and the process image I3 is displayed so as to fill the three squares from 8 seconds to 10 seconds in the row of the process A3.

As illustrated in FIG. 11, the process images I1, I2, and I3 each have a length corresponding to the expected execution time, and the user can intuitively grasp the length of the expected execution time of each of the processes A1, A2, and A3. Further, the process images I1, I2, and I3 are arranged in the execution order on the timing axis, and therefore the user can grasp the execution order of the processes A1, A2, and A3 in chronological order.

Figure 12:
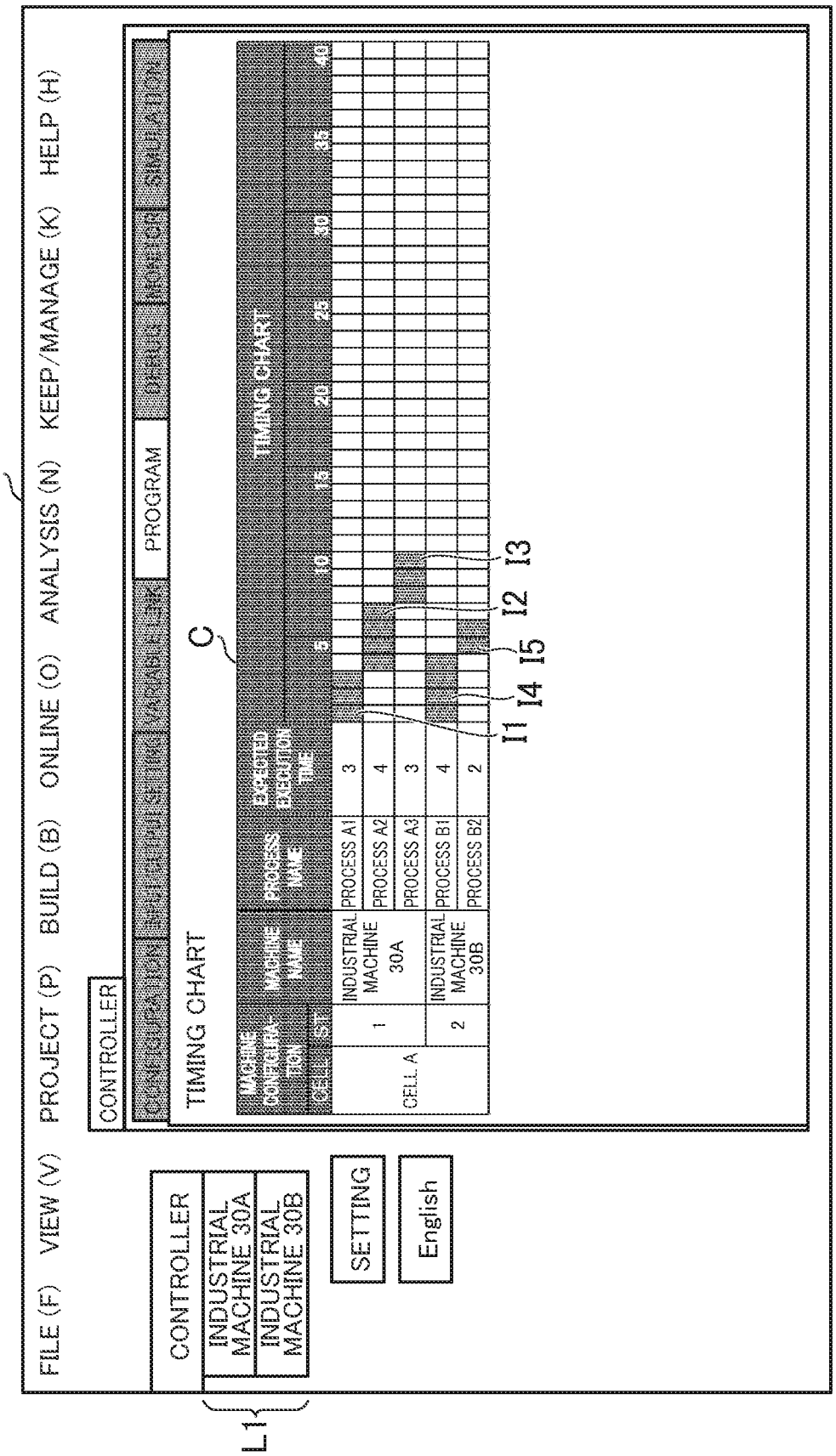
FIG. 12 is a diagram for illustrating an example of a timing chart at a time when a name of an industrial machine is dragged and dropped.

In the state of FIG. 11, only the industrial machine 30A is selected, and therefore the user also selects the name of the industrial machine 30B. For example, when the user drags and drops the name of the industrial machine 30B from the list L1 to the timing chart C, the information on the processes B1 and B2 to be executed by the industrial machine 30B is displayed in the timing chart C. FIG. 12 is a diagram for illustrating an example of the timing chart C at a time when the name of the industrial machine 30B is dragged and dropped. As illustrated in FIG. 12, the name of the industrial machine 30B, the names of each of the processes B1 and B2, and an expected execution time set for each process are newly displayed in the timing chart C. In the example of FIG. 12, as indicated by the process images I4 and I5, the expected execution times of the processes B1 and B2 are 4 seconds and 2 seconds, respectively.

In the state of FIG. 12, the name of the industrial machine 30B has only been dragged and dropped onto the timing chart C, and the execution order of the processes A1, A2, A3 and the processes B1 and B2 has not yet been specified. Therefore, in the timing chart C, a temporal relationship among the processes A1, A2, A3 and the processes B1 and B2 is not distinguished. In this state, the process A1 starts from 0 seconds, and the process B1 also starts from 0 seconds.

In Modification Example (2), through dragging and dropping the process images I displayed in the timing chart C to move the process images I, the execution order of the processes can be specified. As described above, the process B1 is to be executed next after the process A3, and therefore the user specifies the execution order of the processes by dragging and dropping the process image I4 such that the process image I4 is arranged after the process A3 (to a position to the right of the process image I3, which is after 11 seconds).

Figure 13:
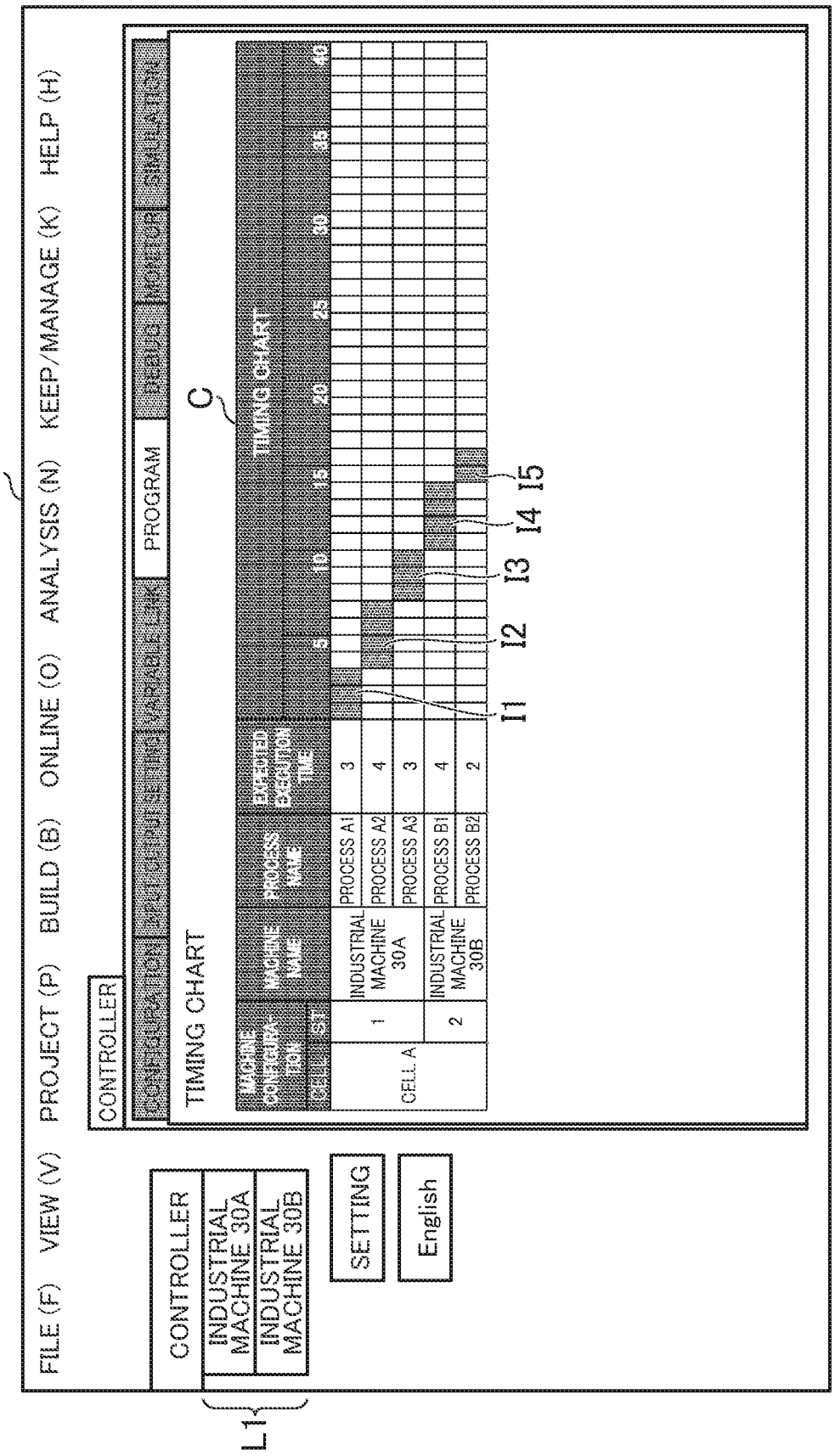
FIG. 13 is a diagram for illustrating an example of a timing chart at a time when an execution order of a process is specified.

FIG. 13 is a diagram for illustrating an example of the timing chart C at a time when the execution order of the processes has been specified. As illustrated in FIG. 13, when the execution order of the processes is specified, the process image I4 is moved to a position after the process image I3 from 11 seconds to 14 seconds in the row of the process B1. A process image I5 is moved in the same manner, and is moved to a position from 15 seconds to 16 seconds in the row of the process B2. In this way, the user specifies the execution order of the processes by dragging and dropping the process images I.

The method of specifying the execution order of the processes is not limited to the example described above, and other operations may be used. For example, the user may specify the execution order of the processes by, in the state of FIG. 12, dragging and dropping the process image I5. For example, the user may drag and drop the process image I5 to a position after the process A3 (to the right of the process image I3). In this case, the timing chart C is in the same state as that of FIG. 13.

Further, for example, the user may specify the execution order of the processes by, in the state of FIG. 12, dragging and dropping the process image I1 to a position before the process B1 (to a position to the left of the process image I4, which is before 0 seconds). In this case, the user specifies that the execution order of the processes A1, A2, and A3 is before the processes B1 and B2, and the timing chart C is in the same state as that of FIG. 13. Moreover, for example, in addition to dragging and dropping the process images I, the execution order of the processes may be specified by, for example, clicking or tapping any position (square) in the timing chart C.

Through the operations described above, the execution order of the process is specified. In Modification Example (2), the start timing of the second cycle can be specified in the timing chart C. For example, in the state of FIG. 13, when the user selects any position in the row of the process A1 as the start timing of the second cycle, the processes of the second and subsequent cycles are displayed in chronological order.

Figure 14:
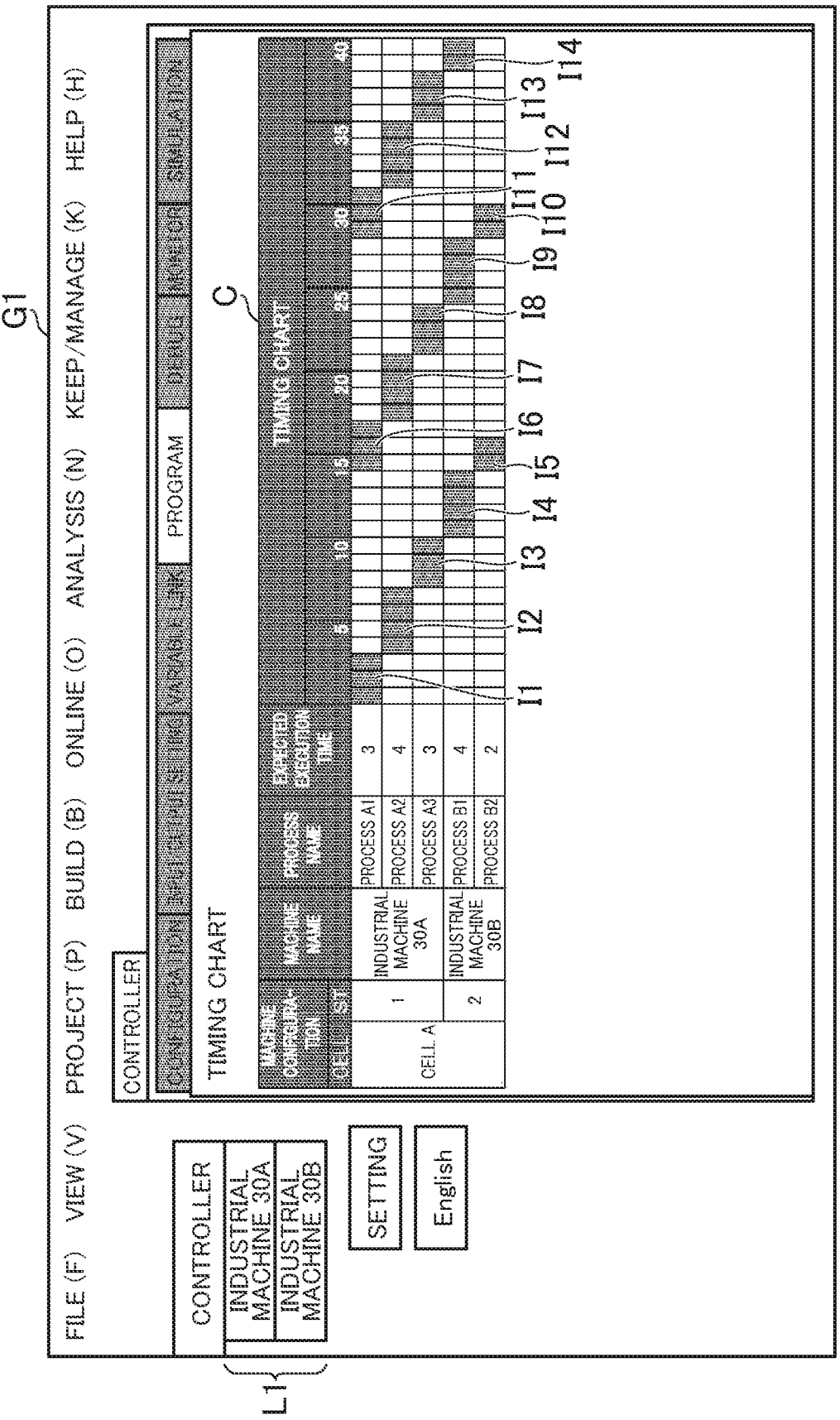
FIG. 14 is a diagram for illustrating an example of a timing chart at a time when a start timing of a second cycle is specified.

FIG. 14 is a diagram for illustrating an example of the timing chart C at a time when the start timing of the second cycle has been specified. For example, when it is assumed that the user selects the square at 15 seconds in the row of the process A1 as the start timing of the second cycle, as illustrated in FIG. 14, a process image I6 representing the process A1 in the second cycle is displayed from 15 seconds to 17 seconds in the row of the process A1.

The execution order and the expected execution time of the processes do not change even after the second cycle. Therefore, as illustrated in FIG. 14, process images 17, 18, 19, 110 representing the processes A2, A3, B1, and B2 in the second cycle are displayed such that each of the processes in the second and subsequent cycles maintains the execution order of the first cycle. Similarly, process images I11, I12, I13, and I14 are displayed such that the third and subsequent cycles are started at the same start timing as that of the second cycle. Process images I that do not fit on the screen are displayed by a scrolling operation.

When the user specifies the execution order of each process as described above, the user performs a build operation for creating the system program Q. When the build operation is performed, a build task is performed based on the process information on each process program P and the execution order specified in the timing chart C, and the system program Q is created.

As the program for performing the building task, various known programs can be used. For example, when a ladder language is used, a start switch or a coil, for example, is arranged such that the value of the start variable, for example, of each process changes based on the execution order specified by the user, and the system program Q is created. As another example, when a robot language is used, a conditional branch command, for example, is described such that the value of the start variable, for example, of each process changes based on the execution order specified by the user, and the system program Q is created. When the system program Q is created, the system program Q is recorded in the controller 20.

As described above, the program creation device 10 of Modification Example (2) is configured to simplify the creation of the system program Q. In the following, details of the configuration are described. In Modification Example (2), the system variables and the machine variables are not required to be distinguished, and variables common to the controller 20 and the industrial machine 30 may be used. This point is the same in Modification Example (3) of the present invention.

Figure 15:
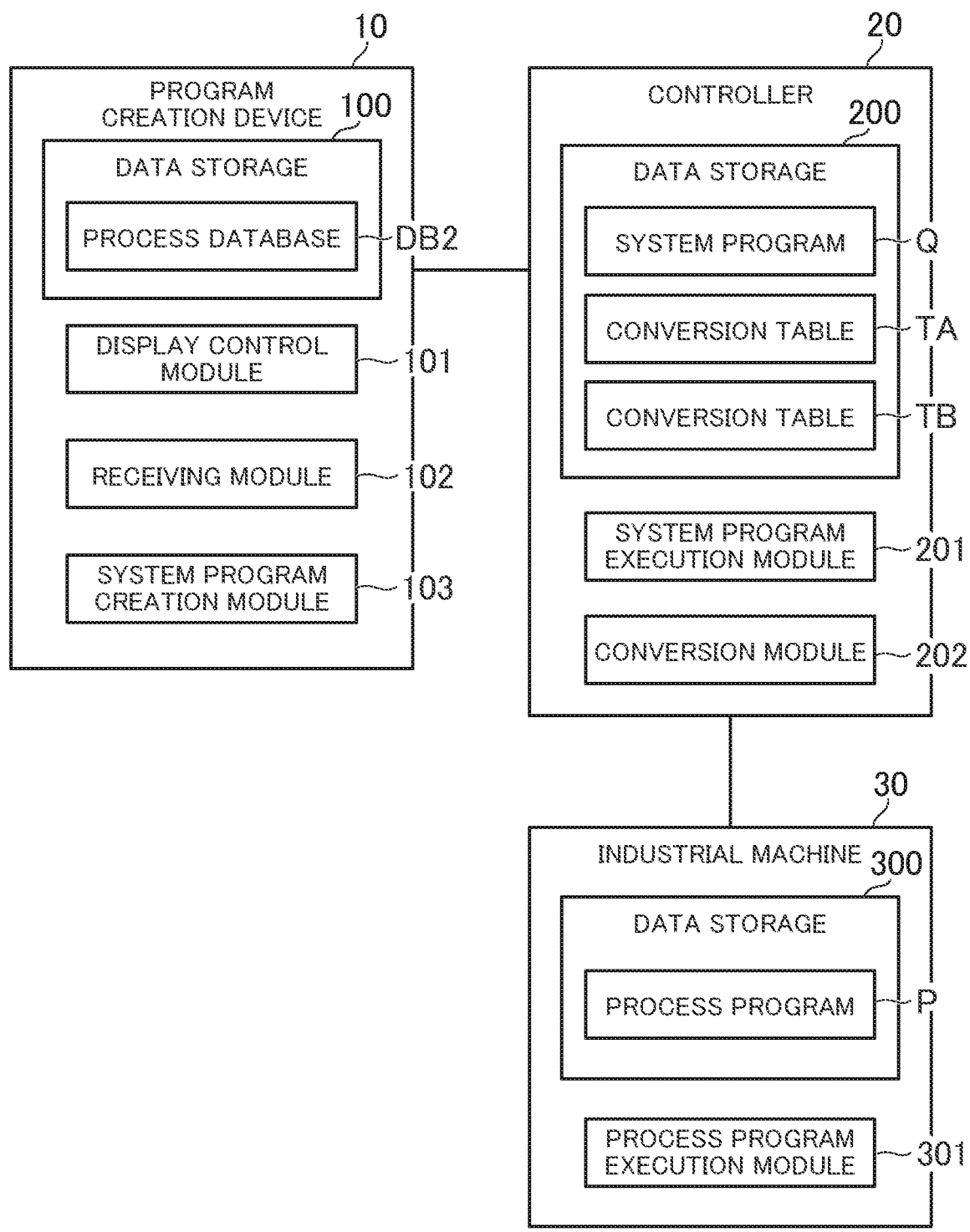
FIG. 15 is a functional block diagram of Modification Example (2) of the present invention.

FIG. 15 is a functional block diagram of Modification Example (2). As illustrated in FIG. 15, in Modification Example (2), a data storage 100, a display control module 101, a receiving module 102, and a system program creation module 103 are implemented in the program creation device 10.

[Data Storage]

The data storage 100 is mainly implemented by the storage 12. The data storage 100 is configured to store the data required for creating the system program Q. For example, the data storage 100 stores a process database DB2 in which process information on each process is stored.

FIG. 16 is a table for showing a data storage example of the process database DB2. As shown in FIG. 16, the names of the industrial machines 30 and the process information on the processes to be executed by the industrial machines 30 are stored in the process database DB2. For example, when the process program P of a new process is to be created, the process information on the new process is registered in the process database DB2. The process information may be editable after being registered in the process database DB2. In Modification Example (2), there is described a case in which the process information on all the industrial machines 30 to be controlled by the controller 20 is stored in the process database DB2, but only the process information on a part of the industrial machines 30 may be stored in the process database DB2.

The process information shows the basic information on the process. The content of the process information is set when the process program P of a new process described later is created. The information required for creating the system program Q from the schedule screen G1 is stored in the process information. For example, the process information stores the name of the process, the expected execution time, the execution order, the names of the variables, execution conditions, and a comment.

The process name is the name specified when the process program P is created. The process name may be any name that can uniquely identify the process in the industrial machine 300, and may even be the same as the name of a process in another industrial machine 30. In Modification Example (2), there is described a case in which the user specifies the process name, but the process name may be automatically conferred based on a predetermined rule. Further, the process name may be anything that can uniquely identify the process, for example, an ID of the process.

In Modification Example (2), the expected execution time is the numerical value specified when the process program P is created. The expected execution time may be a numerical value calculated based on a simulation in place of being specified by the user. The expected execution time may be editable.

The execution order is the execution order of the processes in the overall production system 1. In Modification Example (2), a local execution order in the industrial machine 30 is specified when the process program P is created, and therefore the specified execution order is stored when the process is registered. After the process is registered, the execution order for the overall production system 1 is specified, and therefore the local execution order is changed to the execution order for the overall production system 1.

For example, during creation of the process programs PA1, PA2, and PA3, the execution order of the processes A1, A2, and A3 is specified as being "1," "2," and "3," respectively. Further, for example, during creation of the process programs PB1 and PB2, the execution order of the processes B1 and B2 is specified as being "1" and "2," respectively. At this point, only the execution order in the industrial machine 30 is specified, and therefore it is not identified which of the processes A1, A2, and A3 and the processes B1 and B2 is to be executed first. When the user specifies the execution order of those processes from the schedule screen G1, the execution order of the processes I1 and B2 is changed to "4" and "5."

The local execution order in the industrial machine 30 is not required to be specified during creation of the process program P. In this case, the execution order is not stored when the process is registered, and when the user specifies the execution order from the schedule screen G1, the specified execution order may be stored in the process information. For example, the user specifies "1," "2," "3," "4," and "5" as the execution order for each of the processes A1, A2, A3, B1, and B2 from the schedule screen G1, and the execution order of those processes is stored in the process information.

The name of variable is the name of at least one of a machine variable or a system variable. In Modification Example (2), there is described a case in which the name of a machine variable is stored. The name is set during creation of the process program P. As described in at least one embodiment, when the system variables and the machine variables are to be distinguished, the name of a machine variable is stored. In Modification Example (2), the user can specify not only a default variable but also any variable, and therefore the name of the variable specified by the user may be stored. The variable name in Modification Example (2) includes the name of the process (a character string, for example, "A1") and a character string indicating the type of the variable (a character string, for example, "Start"). The same variable name is not used between processes.

The variable name can be set based on any rule, and is not limited to the example of Modification Example (2). For example, the variable name may include the name of the industrial machine 30 (a character string, for example, "Equip 30A"), which allows identification of which industrial machine 30 the variable is for. Further, for example, the variable name may be defined by a character string that can uniquely identify the variable in the production system 1 or the industrial machine 30 without particularly including the name of the industrial machine 30 or the process name. The variable name can be, like in the case of the process name, a name that can uniquely identify the variable, for example, an ID of the variable.

The execution condition is a condition indicating whether or not the variable is to be changed. As the execution condition of the start variable, a condition for starting the process is set. As the execution condition of the abort variable, a condition for aborting the process is set. As the execution condition of the busy variable, a condition for setting the process to a busy state is set. As the execution condition of the end variable, a condition for ending the process is set.

In Modification Example (2), the local execution order in the industrial machine 30 is specified during creation of the process program P, and therefore when the process is registered, the execution condition is stored such that the specified execution order is obtained. After the process is registered, the execution order for the overall production system 1 is specified, and therefore the execution condition is changed such that the execution order becomes the execution order for the overall production system 1.

For example, during creation of the process program PA1, the process A1 is specified to start when an input/output signal is input. The execution condition of the process A1 is a variable "IO1. Input1" indicating an input/output signal. When the variable "IO1.Input1" becomes a predetermined value, the start variable "A1.Start" becomes a predetermined value, and the process A1 starts.

Further, for example, during creation of the process program PA2, the process A2 is specified to be executed next after the process A1. The execution condition of the process A2 is the end variable "A1.End" of the process A1. When the end variable "A1.End" becomes a predetermined value, the start variable "A2.Start" becomes a predetermined value, and the process A2 starts.

Further, for example, during creation of the process program PA3, the process A3 is specified to be executed next after the process A2. Further, the variable "A2.S1" of the process A2 is also specified to be the start condition of the process A3. As a result, the execution condition of the process A3 is the end variable "A2.End" of the process A2. When the variable "A2.S1" and the end variable "A2.End" each become a predetermined value, the start variable "A3.Start" becomes a predetermined value, and the process A3 starts.

In Modification Example (2), during creation of the process program PB1, the condition for starting the process B1 is not specified. It is specified from the schedule screen G1 that the process B1 is to be executed next after the process A3. Therefore, when the specification is received, the execution condition of the process B1 becomes the end variable "A3.End" of the process A3. When the end variable "A3.End" becomes a predetermined value, the start variable "B1.Start" becomes a predetermined value, and the process B1 starts.

For example, during creation of the process program PB2, the process B2 is specified to be executed next after the process B1. The execution condition of the process B2 is the end variable "B1.End" of the process B1. When the end variable "B1.End" becomes a predetermined value, the start variable "B2.Start" becomes a predetermined value, and the process B2 starts.

The data stored in the data storage 100 is not limited to the example described above. For example, the data storage 100 stores a program for executing the build task of the system program Q. Further, for example, the data storage 100 may store the image data of the images displayed on the schedule screen G1 or may store the engineering tool. As another example, the data storage 100 may store the created process programs P and system program Q.

[Display Control Module]

The display control module 101 is configured to display a schedule screen G1 on which the execution order of a plurality of processes is specifiable. The schedule screen G1 includes the name of each of the plurality of processes stored as process information and acquired from the process database DB2. The process information associates, for each of the plurality of processes, at least, the name of the each of the plurality of processes and at least one of a machine variable or a system variable.

In Modification Example (2), regarding the machine variables, there is described a case in which "refer" and "change" are both performed by the process program P, but only one of "refer" and "change" may be performed. For the machine variables of each process, "refer" and "change" may be performed by the process program P of the process, or "refer" and "change" may be performed by another process program P or the system program Q. As used herein, association of a variable with a process name means that the variable and the process name are included in the same process information, or that the variable and the process name are linked with each other.

The schedule screen G1 on which the execution order is specifiable is a screen including a user interface on which the execution order is specifiable. The execution order can be specified by any method, and the layout of the schedule screen G1 is not limited to the examples of FIG. 10 to FIG. 14. For example, the schedule screen G1 may have a table format layout in place of a timing chart format. Further, for example, the schedule screen G1 may have another layout, for example, a flowchart format.

In Modification Example (2), the display control module 101 displays the timing chart C as the schedule screen G1 based on the execution order received by the receiving module 102 and the name and machine variables of each process included in the execution order. In Modification Example (2), the execution order, the names of the processes, and the machine variables are stored in the process database DB2 as process information, and therefore the display control module 101 displays the timing chart C based on the process information in the process database DB2.

The timing chart C is a chart for showing the execution order of the processes. In other words, the timing chart C is a chart for showing the execution timing of the processes in chronological order. In the timing chart C, information for identifying the processes is arranged in chronological order. For example, in the timing chart C, the names of the processes are arranged in chronological order. Further, for example, in the timing chart C, process images I indicating the execution timing of the processes are arranged in chronological order. Images (for example, icons) other than the process names and process images I may also be used as the information for identifying the processes. The execution order of the processes may be identified based on the numerical value of the execution order stored in the process information, or may be identified based on the variables and the execution condition stored in the process information.

The direction in which the information for identifying the processes is arranged may be any direction, for example, from top to bottom, left to right, bottom to top, or right to left. In Modification Example (2), the names of the processes are arranged in chronological order from top to bottom, and the process images I are arranged in chronological order from left to right. For example, the display control module 101 identifies the names and the execution order of the processes by referring to the process information stored in the process database DB2, and displays the timing chart C in which the names of the processes are arranged from top to bottom in the execution order and the process images I are arranged from left to right in the execution order.

In the timing chart C, the names of each of the plurality of processes included in the execution order are arranged in order on the process axis. The process axis is the direction in which the names of the processes are lined up. In Modification Example (2), the process axis is the direction from top to bottom, but the process axis may be set to a direction determined in advance, for example, from left to right, bottom to top, or right to left. The names of the processes are arranged so as to be listed in chronological order on the process axis. In Modification Example (2), the execution order is specified such that the processes are executed in the order of process A1, A2, A3, B1, and B2. Therefore, the names of those processes are arranged from top to bottom, which is the process axis.

Further, for example, in the timing chart C, the process images I indicating the execution of each of a plurality of processes are arranged with a length on the timing axis being orthogonal to the process axis so as to have substantially the same position on the process axis of each name and in the execution order on the timing axis. The timing axis can also be referred to as "time axis." In Modification Example (2), the timing axis is arranged in a direction from left to right. However, the timing axis is arranged such that an angle of 90 degrees is formed with the process axis, and for example, the timing axis may be arranged in a direction from right to left. Further, for example, when the process axis is from left to right, the timing axis may be from top to bottom.

The process image I and the name of each process are arranged at substantially the same position on the process axis. As used herein, "substantially the same position on the process axis" means that there is no deviation in the process axis direction, or that the deviation is small enough to be regarded as being nonexistent. As used herein, a "small deviation" means that the deviation is less than a predetermined distance, for example, less than 1 centimeter or less than 10 pixels. The process images I of the processes A1, A2, A3, B1, and B2 are each arranged such that the process images I have substantially the same height as the names of the processes and have the execution order on the timing axis. The display control module 101 arranges the process image I of each process such that the process image I is arranged in the chronological order in the timing axis direction. When the same process is repeatedly executed like in the case of Modification Example (2), the process images I are arranged on different timing axes on the same process axis.

In Modification Example (2), the process information on each process includes the expected execution time for that process. The display control module 101 sets the length of the timing axis of the process image I (length in the timing axis direction) to a length corresponding to the expected execution time. The length corresponding to the expected execution time may be a length proportional to the expected execution time, or a length from which the length of the expected execution time can be conceptually grasped. For example, as the expected execution time becomes longer, the process image I becomes longer in the timing axis direction. The display control module 101 determines the length of the process image I of each process based on the expected execution time included in the process information on the process.

The relationship between the expected execution times and the lengths of the process images I is not limited to the example described above. For example, when the expected execution time of a certain process is 10 seconds and the expected execution times of two other processes are 2 seconds and 1 second, respectively, the process images I of the 1-second and 2-second processes may each have a length proportional to those expected execution times, and the 10-second process may be displayed so as to have a shortened length not proportional to the expected execution time. As a result, the execution order can be easily grasped in conceptual manner, and the manner in which the execution order is listed can be improved. Further, the process images I are not required to have a length corresponding to the expected execution time. For example, when the expected execution time is omitted, the process images I may have a fixed length. Moreover, for example, numerical values indicating the expected execution times may be displayed in process images I having a fixed length.

For example, the display control module 101 moves the process images I in the timing chart C based on a movement instruction. The movement instruction is an instruction for moving the process images I. In Modification Example (2), drag and drop is described as an example of the movement instruction, but the movement instruction may be any other operation. For example, the movement instruction may be a click or a tap. Further, for example, the movement instruction is not required to be an operation performed with respect to the process images I, and may be, for example, an operation of clicking or tapping the position of the movement destination of the process images I. Moreover, for example, the movement instruction may be an operation of pressing an arrow button on a keyboard.

In Modification Example (2), the execution order of the processes is specified by moving the process images I, and therefore the movement instruction can be said to be an operation for specifying the execution order. The display control module 101 moves the process images I to the movement destination specified by the movement instruction. The execution order of the processes is also changed in accordance with the arrangement order of the process images I. The execution order of each of the processes is changed such that the arrangement order of the process images I on the timing axis and the execution order match. The execution order may be changed by the system program creation module 103 or by the display control module 101.

In Modification Example (2), in the process database DB2, the names of a plurality of industrial machines 30 are stored in association with the process information on a plurality of processes to be executed by those industrial machines 30, and the display control module 101 displays a list L1 of the names of the plurality of industrial machines 30 on the schedule screen G1. The industrial machines 30 included in the list L1 are all or a part of the industrial machines 30 to be controlled by the controller 20. In Modification Example (2), the industrial machines 30 to be controlled are defined in the process database DB2, and therefore the display control module 101 refers to the process database DB2 to display the list L1 of the industrial machines 30. The list L1 is a list of the names of the industrial machines 30, and the industrial machines 30 may be arranged in any order in the list L1. For example, the names of the industrial machines 30 may be arranged in the list L1 in word order (for example, in alphabetical order) or in order of registration in the process database DB2.

The user can select the name of an industrial machine 30 from the list L1, and the display control module 101 further arranges the process images I of the plurality of processes associated with the selected industrial machine 30 on the process axis of the timing chart C. The display control module 101 acquires the process information associated with the industrial machine 30 selected by the user from the process database DB2, and identifies the processes to be executed by the industrial machine 30 and the execution order of those processes. The display control module 101 is arranged on the process axis of the timing chart C such that the process images I of the identified processes are arranged in the identified execution order.

For example, when the user selects the industrial machine 30A in the list L1 from the state of FIG. 10, the display control module 101 arranges, on the process axis of the timing chart C, the process images I1, I2, and I3 of the processes A1, A2, and A3, respectively, based on the process information on the industrial machine 30A. In this case, the timing chart C transitions to the state of FIG. 11, and each of the process images I1, I2, and I3 is arranged from top to bottom on the process axis. After that, when the user selects the industrial machine 30B in the list L1, the display control module 101 arranges, on the process axis of the timing chart C, the process images I4 and I5 of the processes B1 and B2, respectively, based on the process information on the industrial machine 30B. In this case, the timing chart C transitions to the state of FIG. 12, and each of the process images I4 and I5 is arranged from top to bottom on the process axis.

[Receiving Module]

The receiving module 102 is configured to receive a specification of the execution order on the schedule screen G1 displayed by the display control module 101. In Modification Example (2), the receiving module 102 receives a movement instruction for moving the process images I in the timing chart C on the timing axis, as the specification of the execution order. The execution order is specifiable by any operation, and may be specified by an operation other than a movement instruction. For example, the execution order may be specified by an operation of inputting in the input form a numerical value indicating the execution order or an operation of selecting the execution order from a pull-down menu.

The receiving module 102 receives a selection of the name of an industrial machine 30 from the list L1. The receiving module 102 receives a specification of the execution order of the processes of the industrial machine 30 selected from the list L1. In Modification Example (2), when the name of the industrial machine 30 is displayed in the list L1 but the user does not select the industrial machine 30, the industrial machine 30 is not controlled by the system program Q. The receiving module 102 may receive a selection of the names of all the industrial machines 30 in the list L1, or may receive a selection for only a part of the industrial machines 30. In Modification Example (2), there is described a case in which a name in the list L1 is selected by drag and drop, but the name may be selected by any other operation. For example, the name of the industrial machine 30 may be selected by clicking or tapping a name in the list L1.

The receiving module 102 receives, on the schedule screen G1, a specification of a repetitive operation of each of the plurality of industrial machines 30. The repetitive operation is a periodic operation of the industrial machine 30. As used herein, "specification of a repetitive operation" refers to specifying the execution timing of the repetitive operation. In Modification Example (2), there is described a case in which specifying the start timing of the second cycle corresponds to "specification of the repetitive operation," but the specification of the repetitive operation may specify any start timing from the third and subsequent cycles.

Further, in Modification Example (2), there is described a case in which the repetitive operation is specified by specifying any position on the timing chart C, but the repetitive operation may be specified by any other operation. For example, the repetitive operation may be specified by specifying another process serving as a start condition of the first process of the second cycle (in the example of FIG. 12, the process B1 represented by the process image I4). Moreover, for example, the repetitive operation may be specified by inputting a numerical value for the start timing of the second cycle.

[System Program Creation Module]

The system program creation module 103 is configured to create the system program Q based on the execution order received by the receiving module 102 and at least one of a machine variable of each process or a system variable. The system program creation module 103 creates the system program Q which controls the variables of each process such that each process is executed in the specified execution order.

The machine variables of each of the plurality of processes include a start machine variable (a start variable written as a machine variable) indicating the start of the execution of the process. The system program creation module 103 creates the system program Q such that the processes are sequentially executed in accordance with the execution order. The system program creation module 103 creates the system program Q in such a way by associating, in the execution order, a change system variable (a change variable written as a system variable) corresponding to a change machine variable (a change variable written as a machine variable) to be changed by at least one process and a start system variable (a start variable written as a system variable) corresponding to a start machine variable of one or more other processes to be executed together with the one process.

As used herein, "associating a start system variable with a change system variable" means that the value of the change system variable becomes a condition for changing the value of the start system variable. For example, the end system variable "Equip30A.Step1.EN" of the process A1 is a condition for changing the start system variable "Equip30A.Step2.ST" of the process A2, and therefore those variables are associated with each other in the system program Q.

For example, the system program creation module 103 creates the system program Q by associating the start system variable of another process corresponding to a process image I moved by the display control module 101 and the change system variable of one process corresponding to a process image I present immediately before on the timing axis of the other process. As used herein, "process image present immediately before on the timing axis" refers to the process image I that is most recent in time. In the example of FIG. 13, the process images I1, I2, I3, and I4 are present immediately before the process images I2, I3, I4, and I5, respectively.

In Modification Example (2), the process A1 is the process to be executed first, and therefore in the first cycle, it is not possible for the end system variable of another process to be the start condition. For example, the system program creation module 103 creates the system program Q such that the start system variable of the process A1 is set to a predetermined value when the system variable "IO1.Input1" indicating a predetermined input/output signal becomes a predetermined value. The corresponding machine variable for the system variable "IO1.Input1" may also be defined in the conversion table T.

Further, for example, the process image I2 of the process A2 is present immediately after the process image I1 of the process A1, and therefore the system program creation module 103 creates the system program Q such that the start system variable "Equip30A.Step2.ST" of the process A2 is set to a predetermined value when the end system variable "Equip30A.Step1.EN" of the process A1 becomes a predetermined value. Moreover, for example, the process image I3 of the process A3 is present immediately after the process image I2 of the process A2, and therefore the system program creation module 103 creates the system program Q such that the start system variable "Equip30A.Step3.ST" of the process A3 is set to a predetermined value when the variable "Equip30A.Step2.S-1" of the process A2 and the end system variable "Equip30A.Step2.EN" of the process A2 each become a predetermined value.

Further, for example, the process image I4 of the process B1 is present immediately after the process image I3 of the process A3, and therefore the system program creation module 103 creates the system program Q such that the start system variable "Equip30B.Step4.ST" of the process B1 is set to a predetermined value when the end system variable "Equip30A.Step3.EN" of the process A3 becomes a predetermined value. Moreover, for example, the process image I5 of the process B2 is present immediately after the process image I4 of the process B1, and therefore the system program creation module 103 creates the system program Q such that the start system variable "Equip30B.Step5.ST" of the process B2 is set to a predetermined value when the end system variable "Equip30B.Step4.EN" of the process B1 becomes a predetermined value.

It is assumed that the program for generating the system program Q is stored in the data storage 100. For example, the system program creation module 103 executes a build task to create the system program Q. The command for implementing the above-mentioned processing may be described in, for example, a start switch or a coil in a ladder language, or may be described by a conditional branch command in a robot language. The system program creation module 103 may also create the system program Q by using a compiler, for example, in place of building the system program Q. Moreover, the change system variable associated with the start system variable is not limited to the end variable. For example, like the start system variable "Equip30A.Step3.ST" of the process A3, the change system variable may also be associated with a variable "Equip30A.Step2.S-1" of a signal of the process A2 in addition to the end system variable "Equip30A.Step2.EN" of the process A2.

The system program creation module 103 creates a system program Q which causes each industrial machine 30 to operate in the specified repetitive operation based on the repetitive operation received by the receiving module 102. For example, the system program creation module 103 determines the start timing of the second and subsequent cycles so as to perform the repetitive operation specified by the user.

In the example of FIG. 14, the system program creation module 103 associates the end system variable of the process B1 with the start system variable of the process A1 in the second and subsequent cycles. As a result, the process A1 of the second and subsequent cycles is started when the process B1 of the previous cycle ends, and each process is executed in an execution order like that illustrated in the timing chart C of FIG. 14. The system program creation module 103 creates the system program Q such that the start system variable "Equip30A.Step1.ST" of the process A1 of the second cycle changes when, in place of the variable "IO1.Input1" of the input/output signal, the end system variable "Equip30B.Step4.EN" of the process B1 becomes a predetermined value. The system program creation module 103 creates the system program Q such that the same processing as in the first cycle is performed for the subsequent processing.

According to Modification Example (2), the system program Q can be created by specifying the execution order of the processes from the schedule screen G1, and therefore the creation of the system program Q can be simplified. In a related-art technology, the user is required to create a ladder chart, for example, of each PLC, but according to at least one embodiment of the present invention, the user is only required to specify the execution order of the processes on the schedule screen G1, and therefore the program can be created by a simpler operation.

Further, it is possible to create a system program Q which causes one process to be executed together with another process such that the processes are sequentially executed in accordance with the execution order specified on the schedule screen G1. For example, a change variable to be changed by one process executed beforehand can be set as a condition for starting another process.

(3) Further, for example, an abnormality may occur during execution of a process by the industrial machine 30. In this case, a recovery procedure by the user may be recorded in the server 40, and when the abnormality occurs again, the recorded recovery procedure may be called in order to automatically perform recovery.

Figure 17:
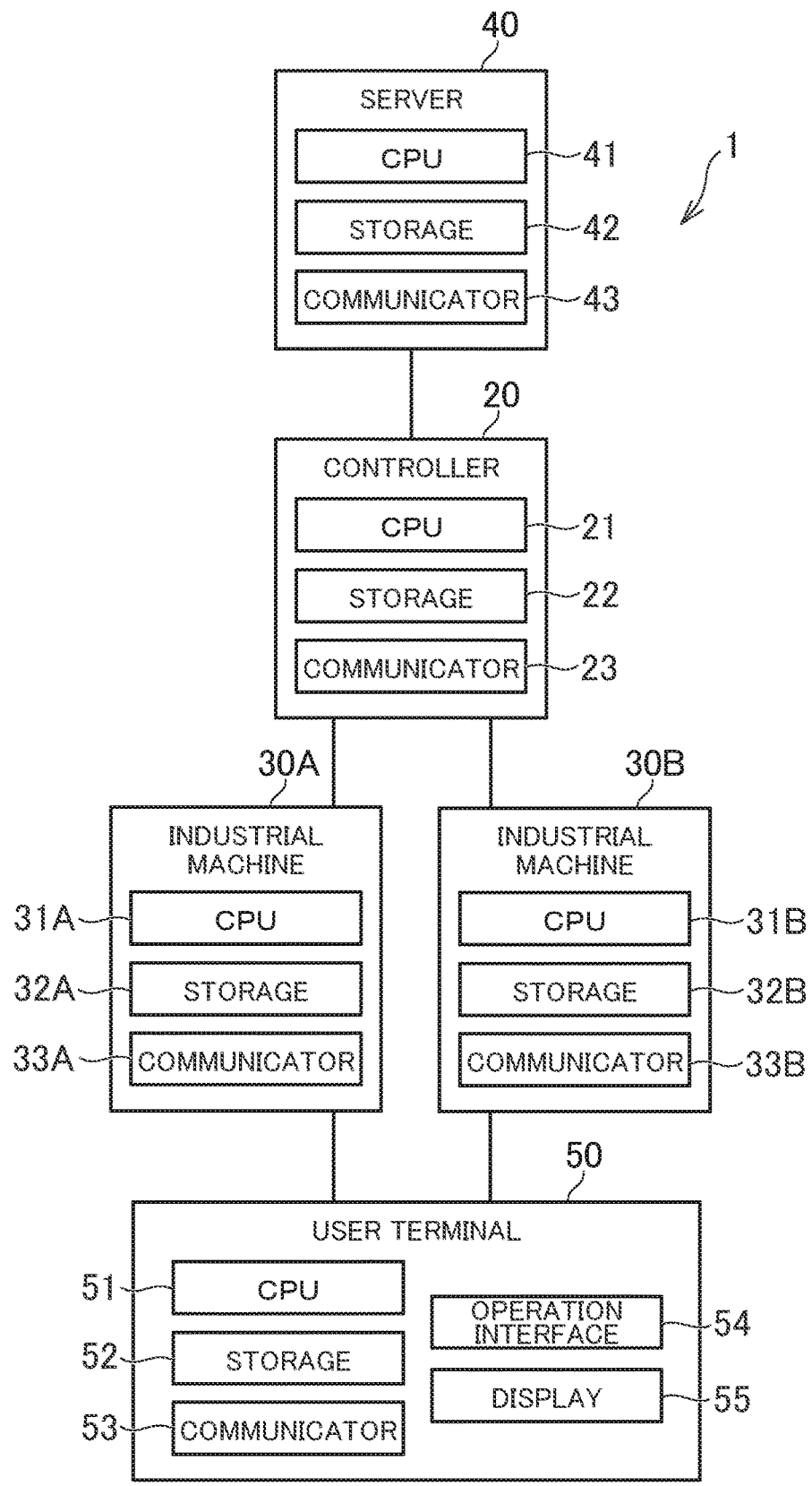
FIG. 17 is a diagram for illustrating an overall configuration of a production system according to Modification Example (3) of the present invention.

FIG. 17 is a diagram for illustrating an overall configuration of a production system 1 according to Modification Example (3) of the present invention. As illustrated in FIG. 17, the production system 1 of Modification Example (3) includes the controller 20, the industrial machines 30A and 30B, the server 40, and the user terminal 50. In Modification Example (3), the program creation device 10 is omitted.

The user terminal 50 is a computer to be operated by the user. For example, the user terminal 50 is a personal computer, a mobile terminal (including a tablet terminal), or a cellular phone (including a smartphone). The user terminal 50 is not limited to those examples, and may be an operator terminal, a programming pendant, or a human machine interface (HMI), for example, a panel controller. The user terminal 50 includes a CPU 51, a storage 52, a communicator 53, an operation interface 54, and a display 55. The user terminal 50 can also be connected to each of the controller 20 and the server 40 (lines connecting those components are not shown in FIG. 17). The user terminal 50 includes a CPU 51, a storage 52, a communicator 53, an operation interface 54, and a display 55. The physical configurations of the CPU 51, the storage 52, the communicator 53, the operation interface 54, and the display 55 may be the same as the physical configurations of the CPU 11, the storage 12, the communicator 13, the operation interface 14, and the display 15, respectively.

Figure 18:
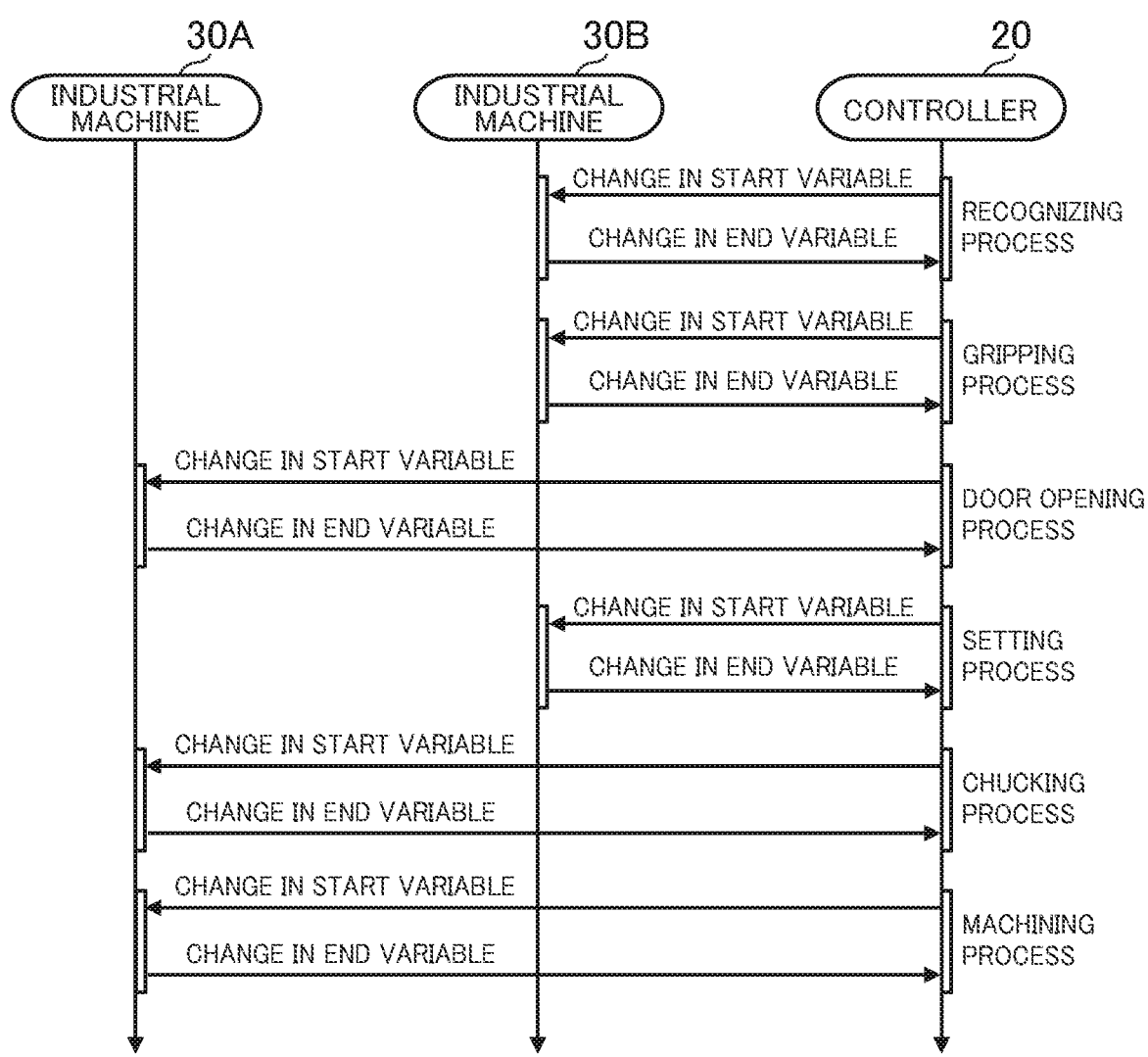
FIG. 18 is a diagram for illustrating how a controller controls an industrial machine.

FIG. 18 is a diagram for illustrating how the controller 20 controls the industrial machine 30. In Modification Example (3), as an example, there is described a case in which the industrial machine 30A is a machine tool and the industrial machine 30B is an industrial robot. For example, the processes are repeated periodically. In FIG. 18, there are illustrated processes to be executed within one cycle. The controller 20 executes the system program and causes the industrial machine 30B to execute a recognizing process as the first process in the cycle. The recognizing process is a process of recognizing a workpiece by using a sensor.

As described above, in Modification Example (3), a variable is prepared for each process, and the start of the process is controlled by the variable. As described in at least one embodiment, the system variables and the machine variables may be converted, or the system variables and the machine variables are not distinguished and variables common to the controller 20 and the industrial machine 30 may be used. In the case of distinguishing between the system variables and the machine variables, when the processes described below are executed, those variables are converted in the same manner as described in at least one embodiment. The conversion of the variables is as described in at least one embodiment, and therefore the details of the conversion are not described in Modification Example (3).

First, the controller 20 changes the start variable for starting the recognizing process to a predetermined value. The value is a value for starting the process, and is, for example, 1. An initial value (for example, 0) is set in the start variable, and the process is started when the start variable changes from the initial value to a predetermined value.

When the industrial machine 30B detects that the start variable of the recognizing process has been changed to the predetermined value, the industrial machine 30B executes the process program P of the recognizing process and starts the recognizing process. When the recognizing process ends normally, the industrial machine 30B changes the end variable of the recognizing process to a predetermined value. The value is a value indicating the end of the process, and is, for example, 1. An initial value (for example, 0) is set in the end variable, and when the process ends, the initial value is changed to a predetermined value.

When the controller 20 detects that the end variable of the recognizing process has been changed to the predetermined value, the controller 20 changes the start variable of a gripping process to be performed next to a predetermined value. The gripping process is a process of gripping, by a robot hand, a recognized work piece and conveying the gripped workpiece to a predetermined position. When the industrial machine 30B detects that the start variable of the gripping process has been changed to the predetermined value, the industrial machine 30B executes the process program P of the gripping process and starts the gripping process. When the gripping process ends normally, the industrial machine 30B changes the end variable of the gripping process to a predetermined value.

When the controller 20 detects that the end variable of the gripping process has been changed to the predetermined value, the controller 20 changes the start variable of a door opening process to be performed next to a predetermined value. The door opening process is a process of opening a door of the industrial machine 30A to insert the workpiece. When the industrial machine 30A detects that the start variable of the door opening process has been changed to the predetermined value, the industrial machine 30A executes the process program P of the door opening process and starts the door opening process. When the door opening process ends normally, the industrial machine 30A changes the end variable of the door opening process to a predetermined value.

When the controller 20 detects that the end variable of the door opening process has been changed to the predetermined value, the controller 20 changes the start variable of a setting process to be performed next to a predetermined value. The setting process is a process of setting the workpiece in the opened door. When the industrial machine 30B detects that the start variable of the setting process has been changed to the predetermined value, the industrial machine 30B executes the process program P of the setting process and starts the setting process. When the setting process ends normally, the industrial machine 30B changes the end variable of the setting process to a predetermined value.

When the controller 20 detects that the end variable of the setting process has been changed to the predetermined value, the controller 20 changes the start variable of a chucking process to be performed next to a predetermined value. The chucking process is a process of fixing the workpiece in order to perform machining. When the industrial machine 30A detects that the start variable of the chucking process has been changed to the predetermined value, the industrial machine 30A executes the process program P of the chucking process and starts the chucking process. When the chucking process ends normally, the industrial machine 30A changes the end variable of the chucking process to a predetermined value.

When the controller 20 detects that the end variable of the chucking process has been changed to a predetermined value, the controller 20 changes the start variable of a machining process to be performed next to a predetermined value. The machining process is a process of machining the workpiece. When the industrial machine 30A detects that the start variable of the machining process has been changed to a predetermined value, the industrial machine 30A executes the process program P of the machining process and starts the machining process. When the machining process ends normally, the industrial machine 30A changes the end variable of the machining process to a predetermined value.

Through performing the processes described above, all of the processes inane cycle are completed. When the controller 20 detects that the end variable of the machining process has been changed to a predetermined value, the controller 20 changes the start variable of the recognizing process to a predetermined value in order to start the next cycle. After that, the next cycle is started in the same manner as in the first cycle. The start variable and end variable of each process each return to their respective initial values at a predetermined timing, for example, at the end of the cycle.

When an abnormality occurs in the processes executed by each industrial machine 30, the execution of the process is aborted, and the abort variable is changed to a predetermined value. The process of detecting the occurrence of an abnormality is written in the process program P. For example, the industrial machine 30A changes the abort variable of the door opening process to the predetermined value when the door does not open in the door opening process. Further, for example, the industrial machine 30B changes the abort variable of the gripping process to the predetermined value when the workpiece is not gripped in the gripping process.

When the controller 20 detects that the abort variable of any of the processes has been changed to the predetermined value, the controller 20 transmits, to the user terminal 50, an abnormality occurrence notification indicating that the abnormality has occurred. In Modification Example (3), there is described a case in which the abnormality occurrence notification is transmitted by using electronic mail, but the notification may be performed by using another medium. For example, the abnormality occurrence notification may be performed by using a push notification, a notification in an engineering tool, or a message application.

Further, for example, the abnormality occurrence notification is not limited to output of information to the user terminal 50, and the abnormality occurrence notification may be performed by another method. For example, the controller 20 may include alight emitter, for example, an LED light, and the light emitter may be configured to perform the abnormality occurrence notification by emitting light. Moreover, for example, the abnormality occurrence notification is not limited to a visual notification, and may be an aural or a tactile notification. For example, the abnormality occurrence notification may be performed by using an alarm sound output from a speaker or by using vibrations from a vibrator.

When the user confirms the abnormality occurrence notification, the user connects the user terminal 50 to the industrial machine 30 to perform recovery from the abnormality. The user terminal 50 and the industrial machine 30 may be connected by wire or wirelessly. In Modification Example (3), as an example, there is described a procedure for performing recovery from an abnormality that has occurred in a machining process of the industrial machine 30A. For example, when the user activates the engineering tool installed on the user terminal 50, a recovery process creation screen for performing recovery from the abnormality is displayed.

Figure 19:
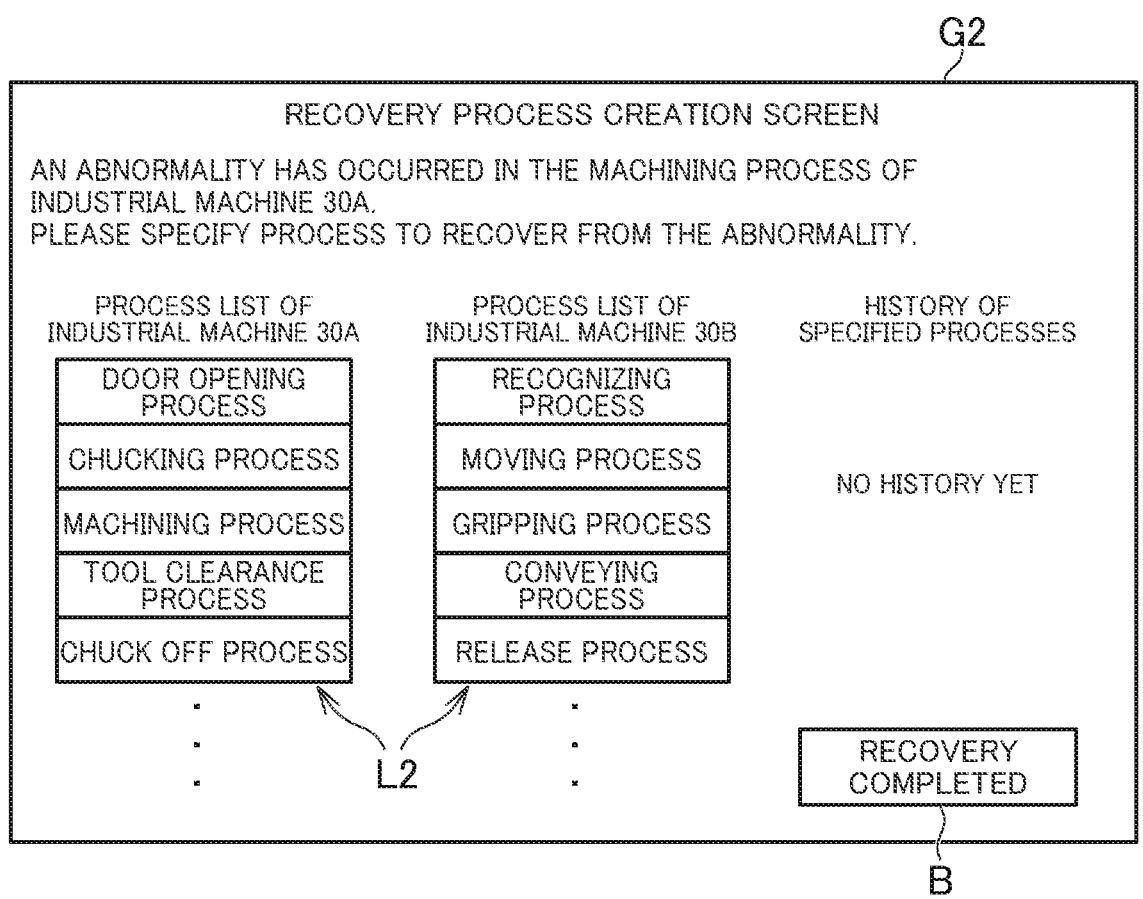
FIG. 19 is a diagram for illustrating an example of a recovery process creation screen.

FIG. 19 is a diagram for illustrating an example of a recovery process creation screen. As illustrated in FIG. 19, a list L2 of processes executable by the industrial machine 30 is displayed on a recovery process creation screen G2. For example, the list L2 displays the names of all the processes that can be executed by each of the industrial machine 30A and the industrial machine 30B. The list L2 may display not only the names of the processes to be executed in the cycle, but also the names of other processes. For example, the list L2 is not limited to displaying the name of a process to be executed in order to perform recovery from an abnormality, but also the names of processes that are not particularly used in abnormality recovery.

The user specifies at least one process from the recovery process creation screen G2, and performs recovery from an abnormality that has occurred in the industrial machine 30. The user can specify any process in the list L2. For example, the user may specify processes of both the industrial machine 30A and the industrial machine 30B, or may specify a process of any one of the industrial machine 30A and the industrial machine 30B. Each of the industrial machine 30A and the industrial machine 30B executes the process(es) selected by the user.

Figure 20:
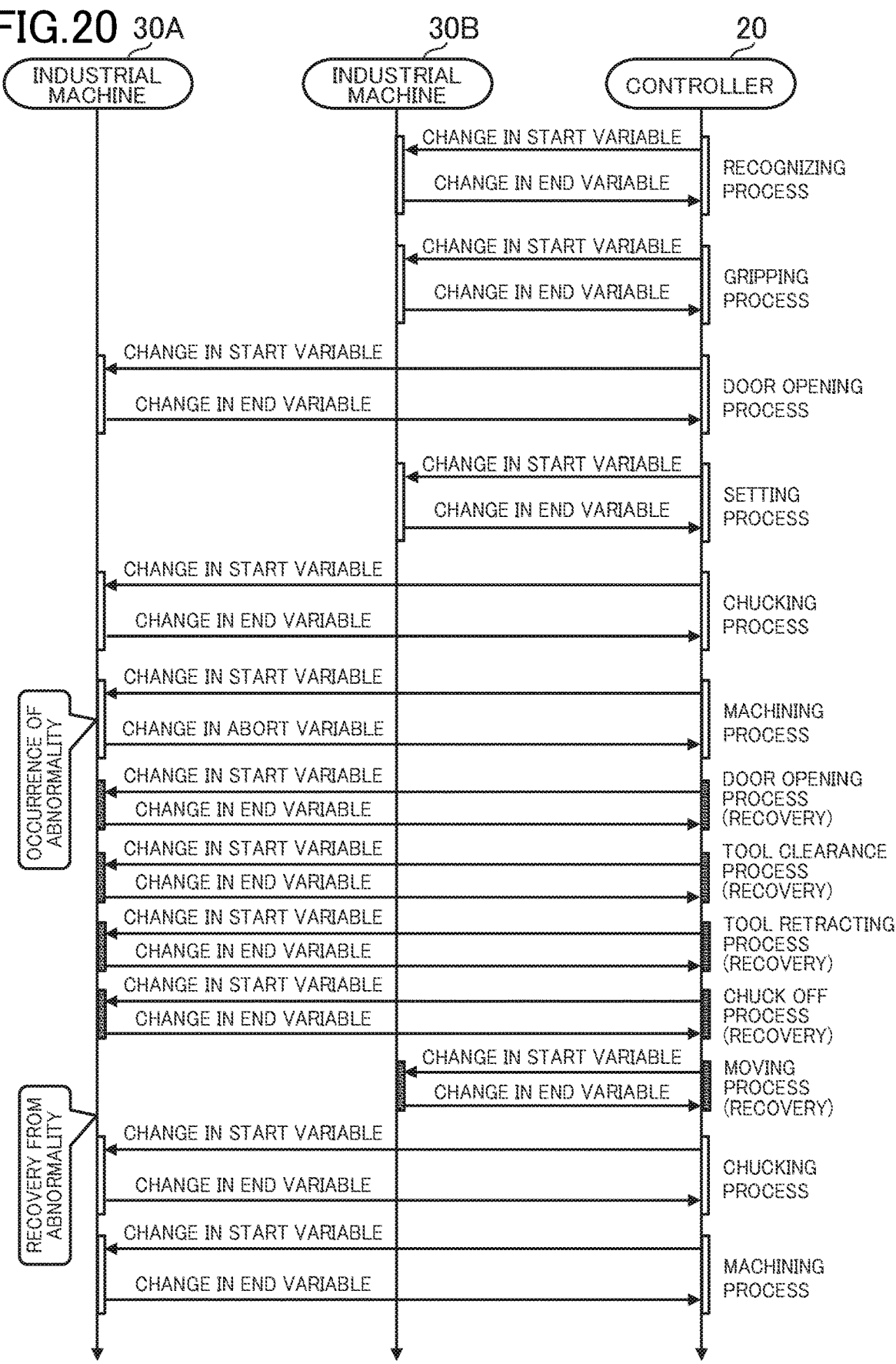
FIG. 20 is a diagram for illustrating how a user manually performs recovery from an abnormality.

FIG. 20 is a diagram for illustrating how a user manually performs recovery from an abnormality. As illustrated in FIG. 20, for example, the user selects, from the recovery process creation screen G2, the door opening process, a tool clearance process, a tool retracting process, and a chuck OFF process of the industrial machine 30A. The tool clearance process and the tool retracting process are each a process for moving a machining tool included in the industrial machine 30A. The chuck OFF process is a process for releasing a chucked state. The industrial machine 30A executes each process in the order specified by the user.

Then, the user selects a moving process of the industrial machine 30B from the recovery process creation screen G2. The moving process is a process for moving the robot hand. The industrial machine 30B executes the moving process in accordance with an instruction by the user. When the user confirms that the abnormality has been recovered from, the user selects a "recovery completed" button B from the recovery process creation screen G2. When the user selects the "recovery completed" button B, the abort variable of the machining process is returned to the initial value, and the cycle is restarted. In the example of FIG. 20, there is illustrated a case in which the cycle is restarted from the chucking process, which is the process immediately before the machining process in which the abnormality occurred.

In Modification Example (3), when the user manually performs recovery from the abnormality, the process specified at that time is recorded in the server 40 as recovery process information. The recovery process information in Modification Example (3), which is described in detail later, is a macro for executing the processes specified by the user in an execution order of the processes. The recovery process information recorded in the server 40 is called by the controller 20 when the abnormality occurs again in the industrial machine 30. The controller 20 performs recovery from the abnormality by executing, based on the recalled recovery process information, the processes by using a procedure specified by the user in the past. The recovery may be executed automatically, or may be executed after the user is asked whether or not to perform recovery.

Figure 21:
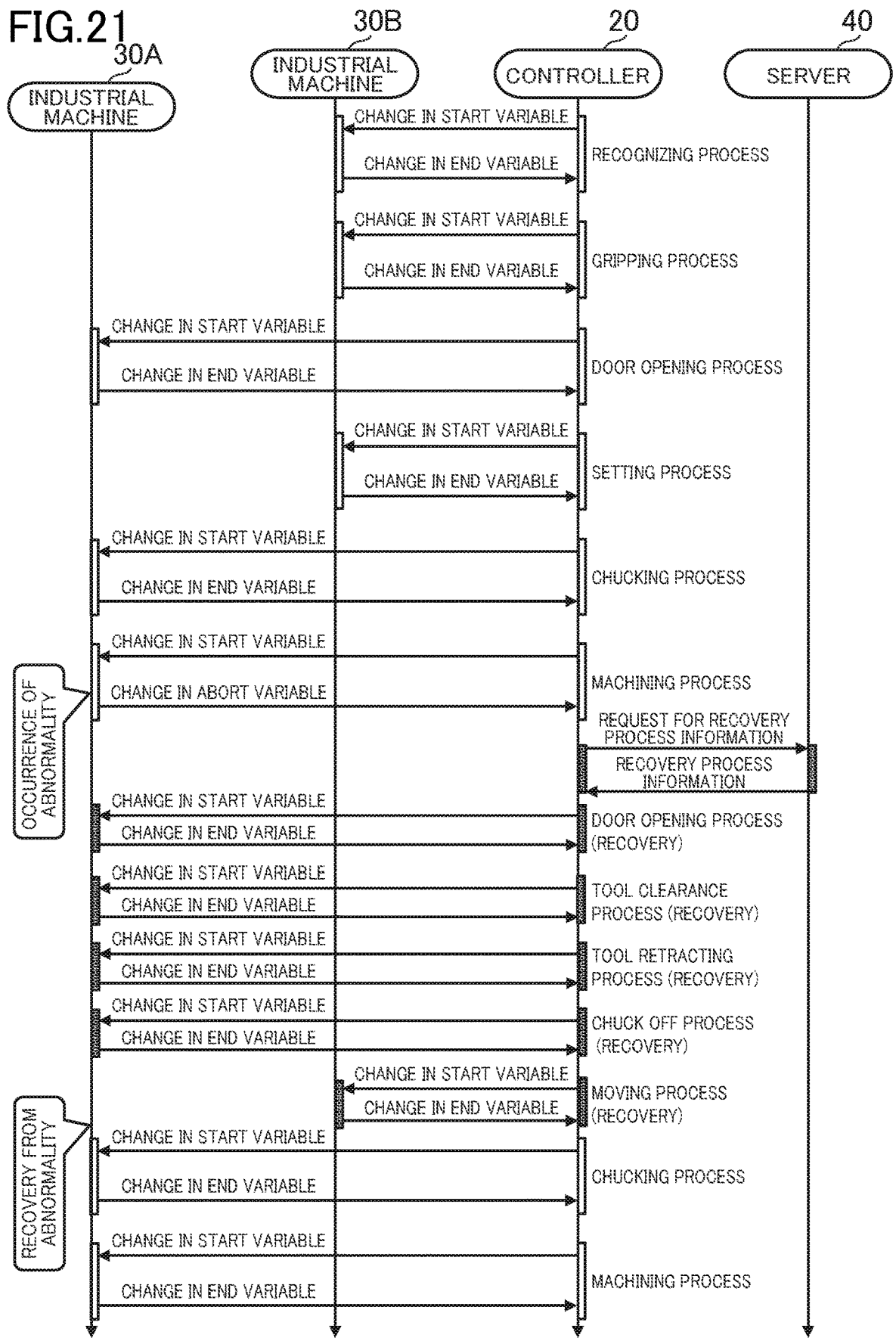
FIG. 21 is a diagram for illustrating how recovery is performed from an abnormality based on recovery process information.

FIG. 21 is a diagram for illustrating how recovery is performed from an abnormality based on recovery process information. As illustrated in FIG. 21, when the abnormality occurs again in the machining process of the industrial machine 30A, the controller 20 requests the recovery process information from the server 40. The server 40 transmits recovery process information registered in the past to the controller 20. The controller 20 causes the industrial machine 30A to execute the door opening process, the tool clearance process, the tool retracting process, and the chuck OFF process based on a recovery procedure received from the server 40, and causes the industrial machine 30B to execute the moving process. Then, when the controller 20 detects that the abort variable of the machining process has been returned to the initial value, the controller 20 changes the start variable of the chucking process to a predetermined value and restarts the cycle.

As described above, in the production system 1 of Modification Example (3), the work and effort involved in recovery from an abnormality that has occurred in the industrial machine 30 is reduced by recording recovery process information in the server 40, and calling the recovery process information by the controller 20 when the abnormality occurs again in the industrial machine 30. Details of the production system 1 of Modification Example (3) are now described.

Figure 22:
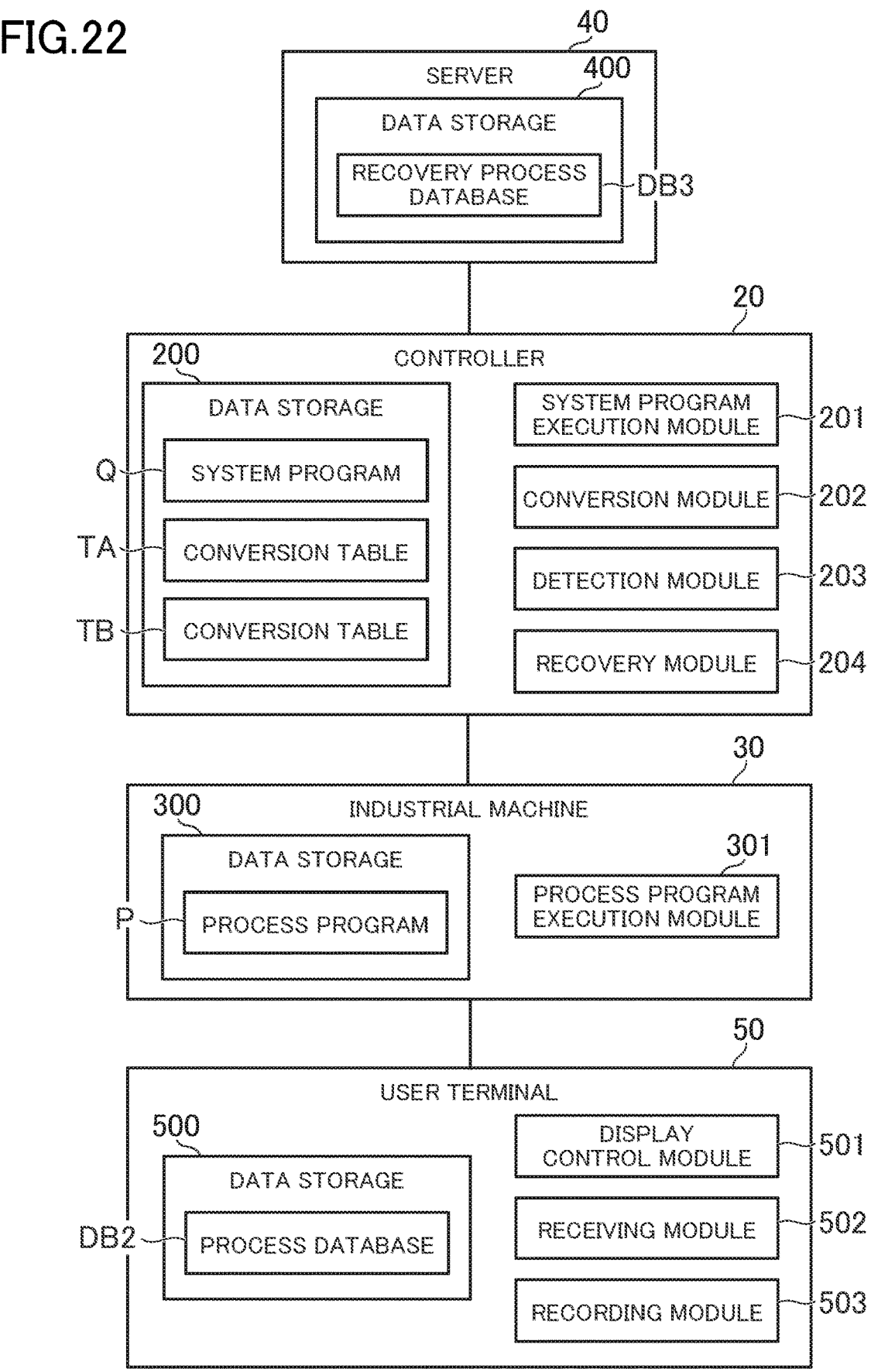
FIG. 22 is a functional block diagram of Modification Example (3).

FIG. 22 is a functional block diagram of Modification Example (3). As illustrated in FIG. 22, in Modification Example (3), a detection module 203 and a recovery module 204 are implemented in the controller 20. Further, in the user terminal 50, a data storage 500, a display control module 501, a receiving module 502, and a recording module 503 are implemented.

[Detection Module]

The detection module 203 is mainly implemented by the CPU 21. The detection module 203 is configured to detect an abnormality that occurs in each industrial machine 30. In Modification Example (3), when an abnormality occurs in a process, the process program P changes the abort variable of the process to a predetermined value. The detection module 203 refers to the value of the abort variable of each process, and determines whether or not the value has become the predetermined value. The detection module 203 determines that an abnormality has occurred in processes in which the abort variable has become the predetermined value. As described in at least one embodiment, in the case of distinguishing between the system variables and the machine variables, the abort variable of the machine variables is converted to a system variable, and then the detection module 203 refers to the value of the abort variable of the system variable.

The method of detecting an abnormality is not limited to a method using a variable, and a known method can be applied as the method of detecting an abnormality itself. For example, the detection module 203 may determine that an abnormality has occurred when a certain process has not ended by a certain period of time, or the detection module 203 may determine that an abnormality has occurred when a detection signal of a sensor connected to the controller 20 or the industrial machine 30 shows an abnormal value.

Further, for example, the industrial machine 30 may transmit a predetermined abnormality occurrence notification to the controller 20 when an abnormality occurs. The abnormality occurrence notification may include any information, for example, the name of the industrial machine 30 in which the abnormality has occurred, the name of the process in which the abnormality has occurred, the type of the abnormality that has occurred, and the date and time at which the abnormality occurred. The detection module 203 determines whether or not the abnormality occurrence notification has been received from the industrial machine 30. The detection module 203 determines that an abnormality has occurred when the abnormality occurrence notification has been received.

[Recovery Module]

The recovery module 204 is mainly implemented by the CPU 21. The recovery module 204 is configured to acquire, when the detection module 203 again detects the abnormality, the one or more processes indicated by the recovery process information recorded by the recording module 503, and to perform recovery from the abnormality by executing the acquired one or more processes. In Modification Example (3), the process(es) specified by the user when the abnormality occurred in the past is (are) indicated in the recovery process information, and therefore the recovery module 204 executes the process(es) in accordance with the procedure described in the recovery process information to perform recovery from the abnormality. Similarly to normal processes, the execution of the processes during recovery is controlled by using the process program P and the variables, and therefore the recovery module 204 executes the process(es) based on the variable(s) of the process(es) indicated in the recovery process information.

For example, when a plurality of processes are to be executed in a predetermined order, the recovery module 204 transmits to the industrial machine 30 an instruction to change the start variable of the first process to a predetermined value. When the industrial machine 30 detects a change in a variable, the industrial machine 30 executes the first process. When the first process ends normally, the industrial machine 30 changes the end variable of the process to a predetermined value. When the recovery module 204 detects that the end variable of the first process has become the predetermined value, the recovery module 204 transmits to the industrial machine 30 an instruction to change the start variable of the second recovery process to a predetermined value. The subsequent processes are executed in the same manner in order until the last process indicated in the recovery process information.

[Data Storage]

The data storage 400 is mainly implemented by the storage 42. The data storage 400 is configured to store recovery process information. For example, the data storage 400 stores a recovery process database DB3 in which at least one piece of recovery process information is stored. When the server 40 receives recovery process information from the user terminal 50, the server 40 stores the received recovery process information in the recovery process database DB3.

FIG. 23 is a table for showing a data storage example of the recovery process database DB3. As shown in FIG. 23, the recovery process database DB3 stores apiece of recovery process information for each name of the recovery process information. For example, the process execution order, the name of the industrial machine 30 to execute the processes, and the names of the processes are stored in the recovery process information. In FIG. 23, the content of the recovery process information is shown in a table, but in Modification Example (3), the recovery process information is written as a macro, and therefore the relationships between the pieces of information are written as macro commands. That is, commands are written in the recovery process information so as to change the start variable to a predetermined value in order of the door opening process, the tool clearance process, the tool retracting process, the chuck OFF process, and the moving process.

[Data Storage]

The data storage 500 is mainly implemented by the storage 52. The data storage 500 is configured to store the data required for recording recovery process information in the server 40. For example, the data storage 500 stores the process database DB2. The process database DB2 may be the same as that in Modification Example (2), but in Modification Example (3), another data storage example is described.

FIG. 24 is a table for showing a data storage example of the process database DB2 in Modification Example (3). As shown in FIG. 24, the process database DB2 is a database in which process information on each process is stored. For example, the process database DB2 stores the name of the industrial machine 30 and the process information on the processes to be executed by the industrial machine 30. The names of the process and the names of the variables are stored in the process information. In Modification Example (3), there is described a case in which the names of the machine variables are stored in the process information, but the names of the system variables may be stored in the process information.

The data to be stored in the data storage 500 is not limited to the example described above. For example, the data storage 500 may store image data of an image displayed on the recovery process creation screen G2, or may store an engineering tool. Further, for example, the data storage 500 may store a created process program P and system program Q. Moreover, for example, the data storage 500 may store the recovery process information registered in the server 40.

[Display Control Module]

The display control module 501 is mainly implemented by the CPU 51. When the detection module 203 detects an abnormality, the display control module 501 displays a recovery process creation screen G2. In Modification Example (3), the process information on each process is stored in the process database, and therefore the display control module 501 displays the recovery process creation screen G2 based on the process database.

The recovery process creation screen G2 includes a user interface configured to receive a specification of at least one process. In other words, the recovery process creation screen G2 receives a specification of at least one process to be executed during recovery. The recovery process creation screen G2 in Modification Example (3) has a layout like that illustrated in FIG. 19. For example, the display control module 501 refers to the process database, and displays the list L2 showing the names of all the processes on the recovery process creation screen G2. It is not required that the list L2 display the names of all the processes for which process information is stored in the process database, and the list L2 may display only the names of a part of those processes.

The layout of the recovery process creation screen G2 is not limited to the layout illustrated in FIG. 19, and may be any layout. For example, the recovery process creation screen G2 may receive a selection of a process in a pull-down format or a drum roll format. As another example, the recovery process creation screen G2 may have a layout in which processes are arranged in chronological order in a flowchart format, or a layout in which input of the process name is received in a tabular format. Further, for example, on the recovery process creation screen G2, input forms for inputting the name of the actual process may be arranged.

[Receiving Module]

The receiving module 502 is mainly implemented by the CPU 52. The receiving module 502 is configured to receive, when the detection module 203 detects an abnormality, a specification of one or more processes to be executed in order to perform recovery based on process information associating, for each of the plurality of processes, at least a name of the process with at least one of a machine variable or a system variable.

The receiving module 502 is configured to receive, when the detection module 203 detects an abnormality, for each of a plurality of processes, a specification of one or more of the processes to be executed in order to perform recovery, based on process information associating at least a name of each process with a variable representing an operation of the industrial machine 30 and indicating that at least one of "refer" or "change" is to be performed by the process program P to be executed in the process.

The process to be executed in order to perform recovery is the process required for recovery from the abnormality detected by detection module 203. In other words, the process to be executed in order to perform recovery is the process specified by the user when the user manually performs recovery from an abnormality. The process to be executed in order to perform recovery may be one process or a plurality of processes. The number of processes to be executed in order to perform recovery may have an upper limit, or may not have a particular upper limit. The receiving module 502 receives the specification of the process(es) based on a detection signal of the operation interface 14.

In Modification Example (3), the process(es) is (are) specified from the recovery process creation screen G2, and therefore the receiving module 502 receives a specification of one or more processes on the recovery process creation screen G2. For example, the receiving module 502 receives the specification of one or more processes from among the processes displayed in the list L2 of the recovery process creation screen G2. The receiving module 502 may repeatedly receive a specification of the same process. Further, for example, the receiving module 502 may receive only a specification of processes of one industrial machine 30, or may receive a specification of various processes of each of a plurality of industrial machines 30.

For example, when the user specifies a plurality of processes, the receiving module 502 receives a specification of the execution order of the plurality of processes. In Modification Example (3), the user repeatedly specifies processes in the list L2, and therefore the order in which the processes are specified corresponds to the execution order. That is, the receiving module 502 receives the specification of the execution order by repeatedly receiving a specification of the processes in the list L2. The order in which the specification of the processes is received becomes the execution order as it is.

The specification of the execution order is not limited to the example of Modification Example (3), and may be performed by using any operation. For example, the receiving module 502 may receive the specification of the execution order by receiving input of a numerical value indicating the execution order. Further, for example, when the recovery process creation screen G2 has the form of a flowchart, the receiving module 502 may receive the specification of the execution order by receiving an operation of specifying the order of the processes.

In Modification Example (3), the process(es) to be executed during recovery can be specified even for an industrial machine 30 other than the industrial machine 30 in which the abnormality occurred. For example, on the recovery process creation screen G2, the processes of the industrial machine 30B in charge of the processes before the machining process of the industrial machine 30A in which the abnormality occurred can also be specified. The receiving module 502 receives the specification of one or more processes to be executed by at least one of the industrial machine 30A or another industrial machine 30B based on the process information on each of the industrial machine 30A in which the detection module 203 detected the abnormality and the another industrial machine 30B executing the processes before those of the industrial machine 30A. The receiving module 502 may receive a specification of the processes of both the industrial machine 30A and the industrial machine 30B, or may receive a specification of the processes of only any one of the industrial machine 30A and the industrial machine 30B.

[Recording Module]

The recording module 503 is mainly implemented by the CPU 52. The recording module 503 is configured to record recovery process information indicating the one or more processes received by the receiving module 502. The recovery process information is information for identifying the processes specified by the user during abnormality recovery. In other words, the recovery process information is information indicating execution results of the processes for performing recovery from the abnormality. In Modification Example (3), there is described a case in which the recovery process information is data having the form of a macro, but the recovery process information may have any data format. For example, the recovery process information may have a text format, a document format, or a CSV format. In addition, for example, a program for changing the start variable of the processes specified by the user one after another may be automatically generated, and the generated program may be recorded as the recovery process information.

In Modification Example (3), there is described a case in which the recording module 503 records the recovery process information in the server 40 communicable to and from the controller 20 controlling the industrial machine 30, but the recording module 503 may record the recovery process information in another computer or an information storage medium. For example, the recording module 503 may record the recovery process information in the user terminal 50, the controller 20, or the industrial machine 30, or may record the recovery process information in another computer (not shown), for example, a database server or a simulation server.

For example, in a case where the user specifies a plurality of processes, the recording module 503 records the recovery process information based on the execution order received by the receiving module 502. In this case, the execution order specified by the user and the name of each process are stored in the recovery process information in association with each other. That is, the recording module 503 records the recovery process information such that each process specified by the user can be executed in the execution order specified by the user.

In Modification Example (3), execution of the processes is controlled based on a variable, and therefore the recording module 503 generates the recovery process information such that the start variable of each process has a predetermined value in the execution order specified by the user. For example, the recording module 503 creates the recovery process information such that the start variable of the door opening process is set to a predetermined value. Further, the recording module 503 creates the recovery process information such that when the end variable of the door opening process becomes a predetermined value, the start variable of the tool clearance process to be performed next is a predetermined value. In the subsequent processes as well, the recording module 503 creates the recovery process information in a similar manner so as to change the start variable of the next process to a predetermined value when the end variable of a certain process becomes a predetermined value. In Modification Example (3), recovery process information in which the commands for changing the values of those variables are written as a macro is generated.

Further, for example, the recording module 503 records recovery process information indicating the one or more processes to be executed by at least one of the industrial machine 30A or another industrial machine 30B. That is, when the user specifies processes of each of a plurality of industrial machines 30, the recording module 503 generates the recovery process information such that the processes specified by the user are executed by the respective industrial machines 30. For example, the recording module 503 generates the recovery process information such that the industrial machine 30B executes the moving process after the industrial machine 30A has executed four processes including the door opening process and other processes. As described above, in the recovery process information, the commands for changing the start variable of each process are written as a macro.

In Modification Example (3), when the recovery process information is recorded by the recording module 503, the user terminal 50 changes the system program Q such that the recovery process information is called when an abnormality occurs. For example, when an abnormality occurs, the user terminal 50 adds, for example, a trajectory switch or a coil for requesting the recovery process information from the server 40 to the ladder chart of the system program Q, or adds a command indicating the request to the source code of the system program Q. Through changing the system program Q, the recovery process information is called when the abnormality occurs again.

According to Modification Example (3), when an abnormality that has occurred in the industrial machine 30 is detected, based on process information, the specification of one or more processes to be executed in order to perform recovery is received and recorded as recovery process information. As a result, it is not required to create a recovery program by using a ladder chart, for example, and it is possible to reduce the time and effort involved in recovery from an abnormality that has occurred in the industrial machine. For example, various abnormalities may occur in the industrial machine, and it takes a lot of time and effort to create a recovery program for each abnormality. However, by specifying the process to be executed in order to perform recovery from the abnormality and recording the execution result, such time and effort can be saved. For example, various abnormalities can be handled by combining processes in an appropriate order.

When the abnormality is again detected, it is possible to easily perform recovery from the abnormality that has occurred in the industrial machine 30 by acquiring one or more processes indicated by the recovery process information and executing the acquired one or more processes to perform recovery from the abnormality.

(4) Further, for example, the modification examples described above may be combined.

Further, for example, the controller 20 may store the process programs P for controlling operation of devices directly controlled by the controller 20. Moreover, for example, there has been described a case in which the conversion data is stored in the controller 20, but the conversion data may be stored in the industrial machine 30 or stored in another computer, for example, the server 40, or an external information storage medium. Further, for example, there has been described a case in which the conversion module 202 is implemented by the controller 20, but the conversion module 202 may be implemented by the industrial machine 30 or may be implemented by another computer, for example, the server 40.

Further, for example, at least one embodiment described above is given as specific examples, and is not to limit the invention disclosed herein to the very configuration and data storage examples of the specific examples. A person skilled in the art may make various modifications to the disclosed at least one embodiment with regard to, for example, the shapes and numbers of physical components, data structures, and execution orders of processing. It should be understood that the technical scope of the invention disclosed herein encompasses such modifications. In other words, it should be understood by those skilled in the art that various modifications, combinations, sub-combinations and alterations may occur depending on design requirements and other factors insofar as they are within the scope of the appended claims or equivalents thereof.

What is claimed is:

1. A production system, comprising:
an industrial machine configured to execute a process program for executing a predetermined process, and to change machine variables that include a first start variable and a first end variable; and
a controller configured to:
execute a system program for causing the industrial machine to operate based on an execution order specified for a plurality of predetermined processes, and to change system variables that include a second start variable and a second end variable;
store conversion data for converting between the machine variables and the system variables;
change the second start variable when the predetermined process is to be started,
converted the second start variable to the first start variable based on the coversion data when the second start variable is changed; and
transmit an instruction that includes the first start variable to the industrial machine,
wherein the industrial machine is further configured to:
receive the instruction from the controller;
change the first start variable that is included in the instruction;
start the predetermined process based on the process program when the first start variable is changed;
change the first end variable when the predetermined process is end; and
transmit a response that includes the first end variable to the controller,
wherein the controller is further configured to:
receive the response from the industrial machine,
convert the first end variable that is included in the response to the second end variable based on the conversion data; and
change the second end variable.

2. The production system according to claim 1,
wherein the controller includes the storage and the circuitry,
wherein the circuitry is configured to convert, based on the conversion data of an industrial machine to serve as a communication partner of the controller, the system variable to the machine variable of the industrial machine to serve as the communication partner of the controller, and to transmit the converted machine variable, and
wherein the circuitry is configured to convert, based on the conversion data of the industrial machine to serve as the communication partner of the controller, the machine variable received from the industrial machine to serve as the communication partner of the controller to the system variable.

3. The production system according to claim 2,
wherein the storage is configured to store a different conversion table for each of a plurality of industrial machines as the conversion data, and
wherein the circuitry is configured to perform conversion between the machine variable of each of the plurality of industrial machines and the system variable based on the conversion table of each of the plurality of industrial machines.

4. The production system according to claim 2,
wherein the storage is configured to store a conversion database in which the conversion data of each of a plurality of industrial machines is stored, and
wherein the circuitry is configured to perform conversion between the machine variable of each of the plurality of industrial machines and the system variable based on the conversion data of each of the plurality of industrial machines stored in the conversion database.

5. The production system according to claim 1,
wherein the storage is configured to store a different conversion table for each of plurality of industrial machines as the conversion data, and
wherein the circuitry is configured to perform conversion between the machine variable of each of the plurality of industrial machines and the system variable based on the conversion table of each of the plurality of industrial machines.

6. The production system according to claim 2, wherein a name of the machine variable of each of a plurality of industrial machines includes a character string for uniquely identifying a process corresponding to the machine variable and a character string which is common to another process.

7. The production system according to claim 2, further comprising a program creation device configured to:
display a schedule screen on which an execution order of a plurality of processes is specifiable, the schedule screen including a name of each of the plurality of processes stored as process information and acquired from a process database, the process information associating, for each of the plurality of processes, at least, the name of the each of the plurality of processes with at least one of the machine variable or the system variable;
receive a specification of the execution order on the schedule screen; and
create the system program based on the received execution order and the at least one of the machine variable or the system variable of each of the plurality of processes.

8. The production system according to claim 5,
wherein the storage is configured to store a conversion database in which the conversion data of each of the plurality of industrial machines is stored, and
wherein the circuitry is configured to perform conversion between the machine variable of each of the plurality of industrial machines and the system variable based on the conversion data of each of the plurality of industrial machines stored in the conversion database.

9. The production system according to claim 5, wherein a name of the machine variable of each of the plurality of industrial machines includes a character string for uniquely identifying a process corresponding to the machine variable and a character string which is common to another process.

10. The production system according to claim 5, further comprising a program creation device configured to:
display a schedule screen on which an execution order of a plurality of processes is specifiable, the schedule screen including a name of each of the plurality of processes stored as process information and acquired from a process database, the process information associating, for each of the plurality of processes, at least, the name of the each of the plurality of processes with at least one of the machine variable or the system variable;
receive a specification of the execution order on the schedule screen; and
create the system program based on the received execution order and the at least one of the machine variable or the system variable of each of the plurality of processes.

11. The production system according to claim 1,
wherein the storage is configured to store a conversion database in which the conversion data of each of a plurality of industrial machines is stored, and
wherein the circuitry is configured to perform conversion between the machine variable of each of the plurality of industrial machines and the system variable based on the conversion data of each of the plurality of industrial machines stored in the conversion database.

12. The production system according to claim 11, wherein a name of the machine variable of each of the plurality of industrial machines includes a character string for uniquely identifying a process corresponding to the machine variable and a character string which is common to another process.

13. The production system according to claim 11, further comprising a program creation device configured to:
display a schedule screen on which an execution order of a plurality of processes is specifiable, the schedule screen including a name of each of the plurality of processes stored as process information and acquired from a process database, the process information associating, for each of the plurality of processes, at least, the name of each of the plurality of processes with at least one of the machine variable or the system variable;
receive a specification of the execution order on the schedule screen; and
create the system program based on the received execution order and the at least one of the machine variable or the system variable of each of the plurality of processes.

14. The production system according to claim 1, wherein a name of the machine variable of each of z plurality of industrial machines includes a character string for uniquely identifying a process corresponding to the machine variable and a character string which is common to another process.

15. The production system according to claim 1, further comprising a program creation device configured to:
display a schedule screen on which an execution order of a plurality of processes is specifiable, the schedule screen including a name of each of the plurality of processes stored as process information and acquired from a process database, the process information associating, for each of the plurality of processes, at least, the name of the each of the plurality of processes with at least one of the machine variable or the system variable;
receive a specification of the execution order on the schedule screen; and
create the system program based on the received execution order and the at least one of the machine variable or the system variable of each of the plurality of processes.

16. The production system according to claim 15,
wherein the machine variables of each of the plurality of processes include a start machine variable indicating start of execution of the each of the plurality of processes, and
wherein the program creation device is configured to create the system program by associating, in the execution order, a change system variable corresponding to a change machine variable to be changed by at least one process and a start system variable corresponding to the start machine variable of one or more other processes to be executed together with the at least one process, such that the plurality of processes are sequentially executed in accordance with the execution order.

17. The production system according to claim 1, wherein the circuitry is configured to:
detect an abnormality that has occurred in each of the plurality of industrial machines;
receive, when the abnormality is detected, a specification of one or more processes to be executed in order to perform recovery based on process information associating, for each of the plurality of processes, at least a name of the each of the plurality of processes with at least one of the machine variable or the system variable; and
record recovery process information indicating the received one or more processes.

18. The production system according to claim 17, wherein the circuitry is configured to acquire, when the abnormality is again detected, the one or more processes indicated by the recorded recovery process information, and to execute the acquired one or more processes to perform recovery from the abnormality.

19. A production method, comprising:
executing, by an industrial machine, a process program for executing a predetermined process, and changing, by the industrial machine, machine variables that include a first start variable and a first end variable; and
executing, by a controller, a system program for causing the industrial machine to operate based on an execution order specified for a plurality of predetermined processes, and to change system variables that include a second start variable and a second end variable;
acquiring conversion data between the machine variables and the system variables;
changing, by the controller, the second start variable when the predetermined process is to be started;
converting, by the controller, the second start variable to the first start variable based on the second conversion data when the second start variable is changed; and
transmitting, by the controller, an instruction that includes the first start variable to the industrial machine,
receiving, by the industrial machine, the instruction from the controller;
changing, by the industrial machine, the first start variable that is included in the instruction;
starting, by the industrial machine, the predetermined process based on the process program when the first start variable is changed;
changing, by the industrial machine, the first end variable when the predetermined process is end; and
transmitting, by the industrial machine, a response that includes the first end variable to the controller;
receiving, by the controller, the response from the industrial machine;
converting, by the controller, the first end variable that is included in the response to the second end variable based on the conversion data; and
changing, by the controller, the second end variable.

20. A non-transitory information storage medium having stored thereon a program for causing, when an industrial machine is configured to execute a process program for executing a predetermined process, and change machine variables that include a first start variable and a first end variable, and are controlled by a controller configured to execute a system program for causing the industrial machine to operate based on an execution order specified for a plurality of predetermined processes, and to change system variables that include a second start variable and a second end variable, the program causing one of the controller and another computer to:
acquire conversion data for converting between the machine variables and the system variables from a storage configured to store the conversion data;
change the second start variable when the predetermined process is to be started;
converted the second start variable to the first start variable based on the coversion data when the second start variable is changed; and
transmit an instruction that includes the first start variable to the industrial machine,
wherein the industrial machine is further configured to:
receive the instruction from the controller;
change the first start variable that is included in the instruction;
start the predetermined process based on the process program when the first start variable is changed;
change the first end variable when the predetermined process is end; and
transmit a response that includes the first end variable to the controller,
wherein the program causing the controller or another computer to:
receive the response from the industrial machine;
convert the first end variable that is included in the response to the second end variable based on the conversion data; and
change the second end variable.

* * * * *